US006411964B1

(12) United States Patent
Iyer et al.

(10) Patent No.: US 6,411,964 B1
(45) Date of Patent: Jun. 25, 2002

(54) METHODS FOR IN-PLACE ONLINE REORGANIZATION OF A DATABASE

(75) Inventors: Balakrishna Raghavendra Iyer; Gary Howard Sockut, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/220,084

(22) Filed: Dec. 23, 1998

(51) Int. Cl.$^7$ .............................................. G06F 12/00
(52) U.S. Cl. ........................................ 707/200; 707/205
(58) Field of Search ................................ 707/1, 2, 3, 6, 707/8, 102, 103, 104, 200, 205, 206; 709/100–105, 200–203

(56) References Cited

U.S. PATENT DOCUMENTS

| | | | | | |
|---|---|---|---|---|---|
| 4,627,019 A | * | 12/1986 | Ng | ................................. | 707/8 |
| 4,648,036 A | * | 3/1987 | Gallant | ........................ | 707/203 |
| 4,823,310 A | * | 4/1989 | Grand | ........................... | 707/8 |
| 4,847,754 A | * | 7/1989 | Obermarck et al. | ........ | 709/104 |
| 5,222,235 A | * | 6/1993 | Hintz et al. | ................. | 707/101 |
| 5,247,672 A | * | 9/1993 | Mohan | ....................... | 711/152 |
| 5,367,675 A | * | 11/1994 | Cheng et al. | .................. | 707/2 |
| 5,434,994 A | * | 7/1995 | Shaheen et al. | ............ | 709/223 |
| 5,455,944 A | * | 10/1995 | Haderle et al. | ............. | 707/202 |
| 5,504,888 A | | 4/1996 | Iwamoto et al. | ............ | 395/600 |
| 5,596,706 A | | 1/1997 | Shimazaki et al. | .... | 395/182.04 |
| 5,596,747 A | | 1/1997 | Katabami et al. | ........... | 395/612 |
| 5,692,178 A | * | 11/1997 | Shaughnessy | .................. | 707/8 |
| 5,717,919 A | * | 2/1998 | Kodavalla et al. | ............. | 707/8 |
| 5,721,915 A | | 2/1998 | Sockut et al. | ............... | 395/616 |
| 5,778,392 A | * | 7/1998 | Stockman et al. | .......... | 707/205 |
| 5,815,415 A | * | 9/1998 | Bentley et al. | ................ | 703/4 |
| 5,864,849 A | * | 1/1999 | Bohannon et al. | ............. | 707/8 |
| 5,940,813 A | * | 8/1999 | Hutchings | ..................... | 705/43 |
| 5,983,225 A | * | 11/1999 | Anfindsen | ....................... | 707/8 |
| 6,023,706 A | * | 2/2000 | Schmuck et al. | ........... | 707/200 |
| 6,067,545 A | * | 5/2000 | Wolff | .......................... | 707/10 |
| 6,144,970 A | * | 11/2000 | Bonner et al. | ............. | 707/206 |
| 6,185,601 B1 | * | 2/2001 | Wolff | ......................... | 709/203 |

FOREIGN PATENT DOCUMENTS

| | | |
|---|---|---|
| JP | 06-67944 | 3/1994 |
| JP | 06-67950 | 3/1994 |
| JP | 07-175699 | 7/1995 |
| JP | 07-244604 | 9/1995 |
| JP | 07-311702 | 11/1995 |
| JP | 09-34758 | 2/1997 |

OTHER PUBLICATIONS

IBM Corporation, "DB2 for OS/390 Version 5: Utility Guide and Reference—Chapter 2–14: Reorg," SC26–8967–00, Jun. 1997.

IBM Technical Disclosure Bulletin, "Reducing Buffer Pool Working Set for Certain Database Utilities," Vol. 32, No. 10B, Mar. 1990, p. 339.

Nakamura, T. et al., "Performance Improvement in Relational Database Management System," NTT R&D, vol. 41, No. 12, 1992, pp. 1397–1406—Translation: English abstract.

(List continued on next page.)

Primary Examiner—Dov Popovici
Assistant Examiner—Mary Wang
(74) Attorney, Agent, or Firm—Gates & Cooper LLP

(57) ABSTRACT

An in-place reorganization of a database achieves reasonably accurate results for users during high-throughput concurrent usage of the database. The reorganization's movement of records across a user transaction's position within a scan of the database is tracked. The behavior of the user transaction is corrected to account for the movement of the records.

69 Claims, 20 Drawing Sheets

OTHER PUBLICATIONS

Omiecinski, E. et al., "Concurrent File Reorganization for Record Clustering: A Performance Study," Proceedings of the 8$^{th}$ International Conference on Data Engineering, IEEE–CS, Feb. 1992, IEEE, 1992, pp. 265–272.

Omiecinski, E. et al., "Performance Analysis of a Concurrent File Reorganization Algorithm for Record Clustering," IEEE Transactions on Knowledge and Data Engineering, vol. 6, No. 2, Apr. 1994, pp. 248–257.

Salzberg, B. et al., "Principles of Transaction–Based On–Line Reorganization," Proceeding of the 18$^{th}$ VLDB Conference, Vancouver, British Columbia, Canada 1992, Morgan Kaufmann Publishers, San Mateo, CA, Aug. 1992, pp. 511–520.

Sockut, G.H. et al., "A Method for On–Line Reorganization of a Database," IBM Systems Journal, vol. 36, No. 3, 1997, pp. 411–436.

Sockut, G.H. et al, "Reorganizing Database Concurrently with Usage: A Survey," Technical Report 03.488, IBM, Santa Teresa Laboratory, San Jose, CA, Jun. 1993.

Sockut, G.H. et al., "Database Reorganization—Principles and Practice," Computing Surveys, ACM, vol. 11, No. 4, Dec. 1979, pp. 371–395.

* cited by examiner

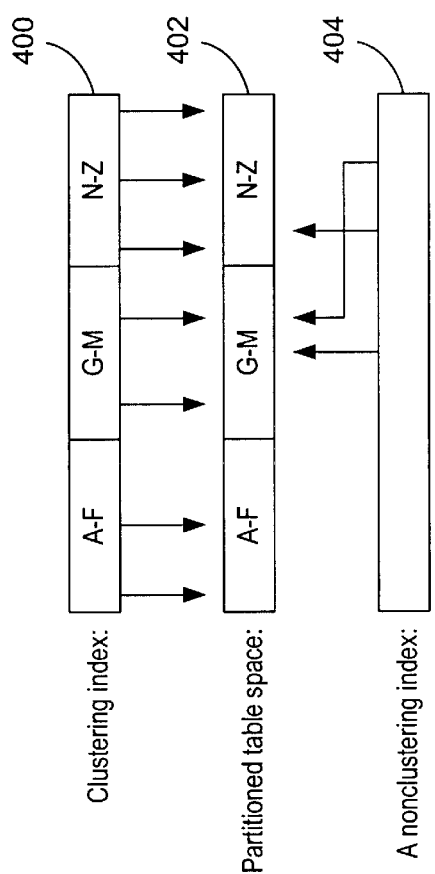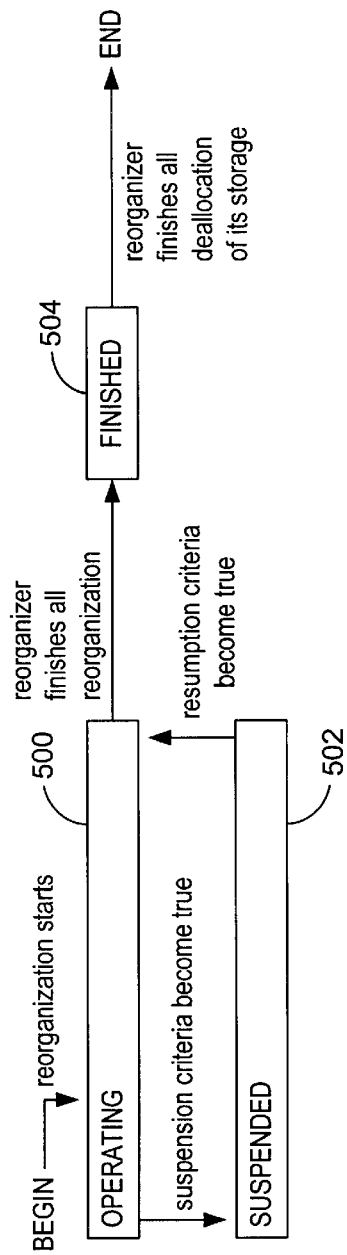

| PRE-MOVE TARGET → / PRE-MOVE SOURCE ↓ | RID is ahead of user. 1 | | RID is behind user. 5 | RID is behind of user. N↑ 0 7 | | RID is behind user. 0 8 |
|---|---|---|---|---|---|---|
| RID is ahead of user. 2 | | 1 ² | 1 ⁴N | | 1 N↑N0 9 | 1 ⁶ |
| RID is behind user. 0→N 3 | (if paired 0's RID had unpaired N) 5 ² | (otherwise) 0 5 ² | 0 5 ³→N | (if record returns to original RID) 5 ⁶ | (otherwise) 0 5 →N↑N0 10 | 0 5 →N0 11 |
| RID is behind user. N 4 | | 5 ² | 5 ⁴N | 5 | 5 N↑N0 9 | 5 ⁶ |
| RID is behind user. 6 | | 0 8 ² | 0 7 ³→N | 0 7 | 0 7 →N↑N0 10 | 0 7 →N0 11 |
| RID is behind user. N←0 9 | | N←0 7 ² | N←0 7 ⁴N | N←0 7 | N←0 7 N↑N0 9 | N←0 7 ⁶ |
| RID is behind user. 0→N N←0 10 | (if paired 0's RID had unpaired N) N←0 7 ² | (otherwise) 0 2 N←0 7 | 0 3 →N N←0 7 | (if record returns to original RID) N←0 7 ⁶ | (otherwise) 0 →N↑N0 10 N←0 7 | 0 →N0 11 N←0 7 |
| RID is behind user. 0→N 0 11 | (if paired 0's RID had unpaired N) 0 8 ² | (otherwise) 0 2 0 8 | 0 3 →N 0 8 | (if record returns to original RID) 0 8 ⁶ | (otherwise) 0 →N↑N0 10 0 8 | 0 →N0 11 0 8 |

FIG. 10

METHODS FOR IN-PLACE ONLINE REORGANIZATION OF A DATABASE

BACKGROUND OF THE INVENTION

1. Field of the Invention

This invention relates in general to database management systems performed by computers, and in particular, to a method of providing in-place reorganization of a database.

2. Description of Related Art (Note: This application references a number of different publications as indicated throughout the specification by reference numbers enclosed in brackets, e.g., [x]. A list of these different publications ordered according to these reference numbers can be found in Section 8 of the "Detailed Description of the Preferred Embodiment." Each of these publications is incorporated by reference herein.)

Any database management system (DBMS) can need some type of reorganization. Reorganization of a database is defined as changing some aspect of the logical and/or physical arrangement of the database. A tutorial paper referenced in [12] discusses issues in reorganization and types of reorganization. This specification describes the problem in reorganizing offline, and the need for online reorganization. (See, e.g., [11]).

The type of reorganization described herein involves restoration of clustering. Clustering is the practice of storing records near each other if they meet certain criteria. One popular criterion is consecutive values in a column of the records. Clustering should reduce disk input/output for records that users often access together. When users write data into the database, this writing can decrease the amount of clustering and thus degrade performance.

Reorganization can restore clustering and performance. During most types of reorganization in a typical database, the area being reorganized is offline or only partially available; users cannot write (and perhaps cannot even read) data in that area. However, a highly available database (a database that is to be fully available 24 hours per day, 7 days per week) should not go offline for significant periods, of course. Applications that require high availability include reservations, finance (especially global finance), process control, hospitals, police, armed forces, and Internet service.

Even for less essential applications, many database administrators prefer 24 hour availability. The maximum tolerable period of unavailability is specific to the application. When queried, DBMS customers (not all of whom have highly available databases) state that the maximum tolerable period ranges from 0 to 5 hours. Even without such a preference for 24-hour availability, reorganizing a very large database might require much longer than the maximum tolerable period of unavailability.

As examples of very large databases, a survey paper [6] mentions a database with several terabytes of data and the desire for one with petabytes. The author of one book [14] considers offline reorganization such an important problem for very large databases that he defines a very large database as one "whose reorganization by reloading takes a longer time than the users can afford to have the database unavailable." These considerations call for the ability to reorganize the database online (concurrently with usage or incrementally within users' transactions), so that users can read and write the database during most or all phases of reorganization.

In the context of papers that do not concentrate on online reorganization, many people have stated the need for the ability to reorganize online. As the amount of information and dependence on computers both grow, the number of very large or highly available databases will grow. Therefore, the importance of online reorganization will grow.

The present invention provides methods for in-place online reorganization (specifically, for restoration of clustering). The data structures are those of IBM's DBMS Database 2 (DB2) for OS/390 [4], but the concepts in the methods presented herein should apply to many DBMS's. The methods perform reorganization in place; i.e., they do not make a new copy of the data being reorganized. To allow high-throughput concurrent usage by users of the database, the methods track the reorganization's movement of records across a user's position within a scan of data, and they correct the behavior of a user transaction to account for the movement.

This specification describes relevant features of a DBMS, discusses the advantages of the present invention over previous research (including the novelty of the methods), presents the concepts in the methods, describes the methods in more detail, and proposes extensions based on the methods.

SUMMARY OF THE INVENTION

To overcome the limitations in the prior art described above, and to overcome other limitations that will become apparent upon reading and understanding the present specification, the present invention discloses a method, system, and article of manufacture for providing in-place reorganization of a database that achieves reasonably accurate results for users during high-throughput concurrent usage of the database. The reorganization's movement of records across a user transaction's position within a scan of the database is tracked. The behavior of the user transaction is corrected to account for the movement of the records.

BRIEF DESCRIPTION OF THE DRAWINGS

Referring now to the drawings in which like reference numbers represent corresponding parts throughout:

FIG. 4 shows an example of a clustering index, a table space, and a non-clustering index according to the preferred embodiment of the present invention;

FIG. 5 shows a state transition diagram for the reorganizer according to the preferred embodiment of the present invention;

FIG. 10 shows an associated chart for the states of a pair of record IDs (RIDs) (source and target) according to the preferred embodiment of the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

1.0 Introduction

The present invention describes methods for performing one type of reorganization online. The type of reorganization distributes free space evenly, removes overflow, and clusters data. The methods perform reorganization in place; i.e., they do not make a new copy of the data being reorganized. To allow high-throughput concurrent usage by users of the database, the methods track the reorganization's movement of records across a user's position within a scan of data, and they correct the behavior of a user transaction to account for the movement. The novelty provided by the present invention is online restoration of clustering that is both (1) in place (to obviate extra disk space for a copy of the data) and (2) supportive of high-throughput concurrent usage with reasonably accurate results.

1.1 Hardware Environment

Figure 1:
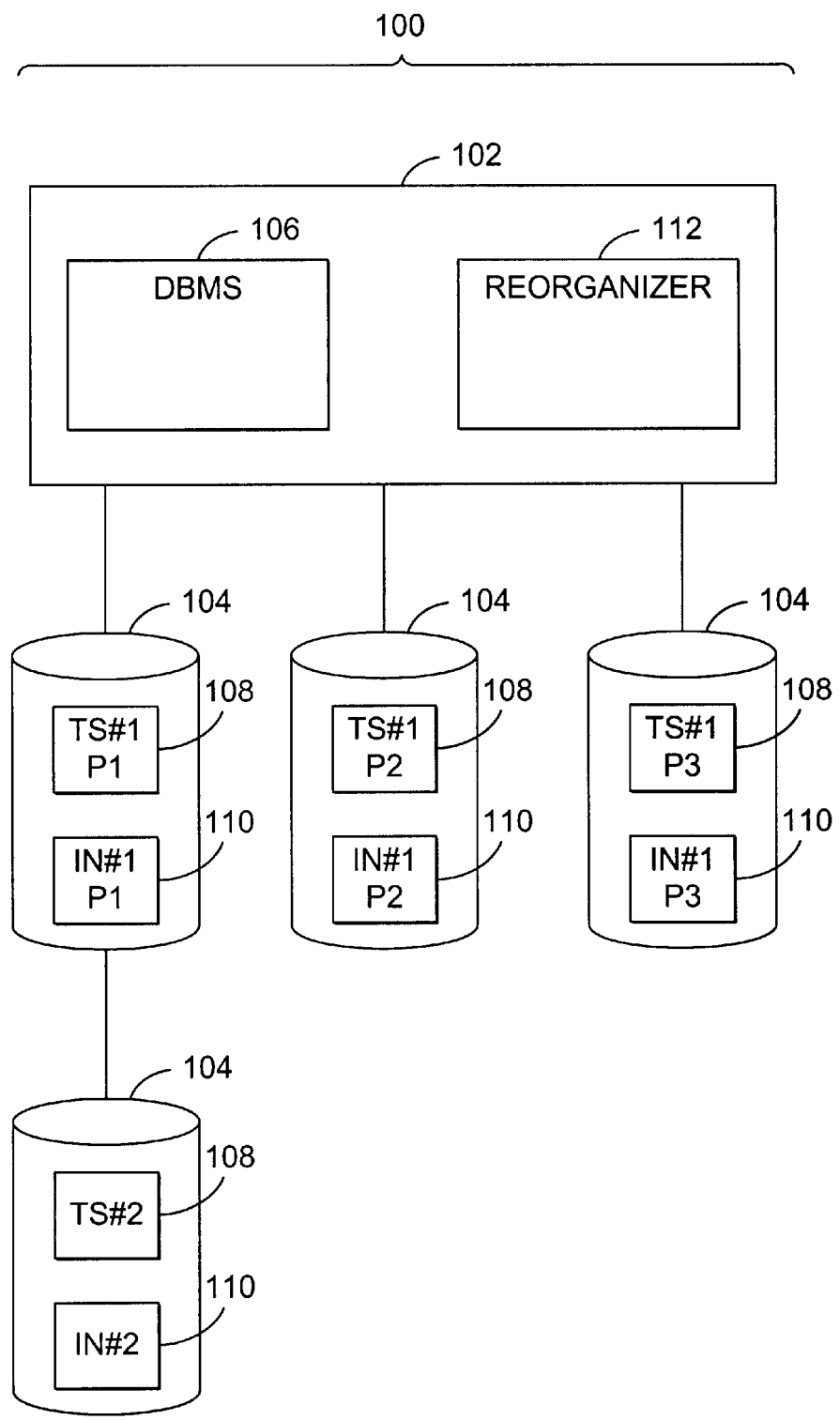
FIG. 1 illustrates an exemplary computer hardware environment that could be used with the preferred embodiment of the present invention.

FIG. 1 illustrates an exemplary computer hardware environment that could be used with the preferred embodiment of the present invention. In the exemplary environment, a computer system 100 is comprised of one or more processors 102, each of which is connected to one or more data storage devices 104. The processor 102 executes database management system (DBMS) software 106 that manages one or more databases having one or more tables 108 and associated indices 110 stored on the data storage devices 104.

The tables 108 and indices 110 may be comprised of a plurality of partitions, as for example in the table 108 labeled as TS#1 and the index 110 labeled as IN#1, wherein the partitions are labeled as P1, P2, P3. This partitioning scheme, which is well known in the art, allows parallelized access and retrieval functions among both the data storage devices 104.

Alternatively, the tables 108 and indices 110 may be comprised of a single contiguous space, as for example in the table 108 labeled as TS#2 and the index 110 labeled as IN#2. In effect, this configuration comprises a single partition.

The processor 102 also executes reorganizer software 112 that reorganizes the tables 108 and associated indices 110 stored on the data storage devices 104. This reorganization comprises a logical and/or physical arrangement of the tables 108 and associated indices 110.

Generally, the DBMS 106, tables 108, associated indices 110, and reorganizer 112 comprise instructions and/or data that is embodied in or retrievable from a computer-readable device, medium, or carrier, e.g., a memory, a data storage device 104, a remote device coupled to the computer system 100 by a data communications device, etc. Moreover, these instructions and/or data, when read, executed, and/or interpreted by the computer system 100, cause the computer system 100 to perform the steps necessary to implement and/or use the present invention.

Thus, the present invention may be implemented as a method, system, or article of manufacture using standard programming and/or engineering techniques to produce software, firmware, hardware, or any combination thereof. The term "article of manufacture", or alternatively, "computer program carrier", as used herein is intended to encompass instructions and/or logic and/or data accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

2.0 Features of a DBMS

This section describes a set of DBMS 106 features (storage structures, types of concurrency control, and types of access), which come from System R [2] and DB2 [4, 3]; several other relational DBMS's use comparable features. This description applies to normal usage, i.e., without online reorganization; the types of access are later modified to accommodate online reorganization.

2.1 Storage Structures, Structural Degradation, and Offline Reorganization 2.1.1 Storage Structures for Data The discussion of storage structures begins with the structures for data.

A row of a table 108 in a database is a logical unit within the table 108. For example, if Jones is an employee, a table 108 of employees includes a row for Jones. A row contains columns of data, e.g., for name, job title, and salary. A column can have a fixed length (which does not change) or a variable length. The length of a variable-length column changes for each row according to the length of the data that users place in that column in that row. Ordinarily, the DBMS 106 implements a row by one data record, which is a lower-level (more physical) unit in storage. It will be explained shortly that sometimes the DBMS 106 implements a row by two data records. Users see rows, but do not directly see data records.

When users write rows (and thus the DBMS 106 writes records to implement the writing of rows), the DBMS 106 tracks the writing by appending corresponding entries to a collection of entries called the log. Later, it is possible to recover after an accidental loss of data by reloading from a backup copy of data and then applying (performing on the data) the log entries that the DBMS 106 appended after creation of the backup copy. The log record sequence number (LRSN) of a log entry is a number that represents the entry's position in the log.

A table 108 space is a region of storage that stores the data records for one or more tables 108. For simplicity, only one table 108 per table 108 space is used in the examples described herein, although any number of tables 108 and table 108 spaces could be used.

Figure 2:
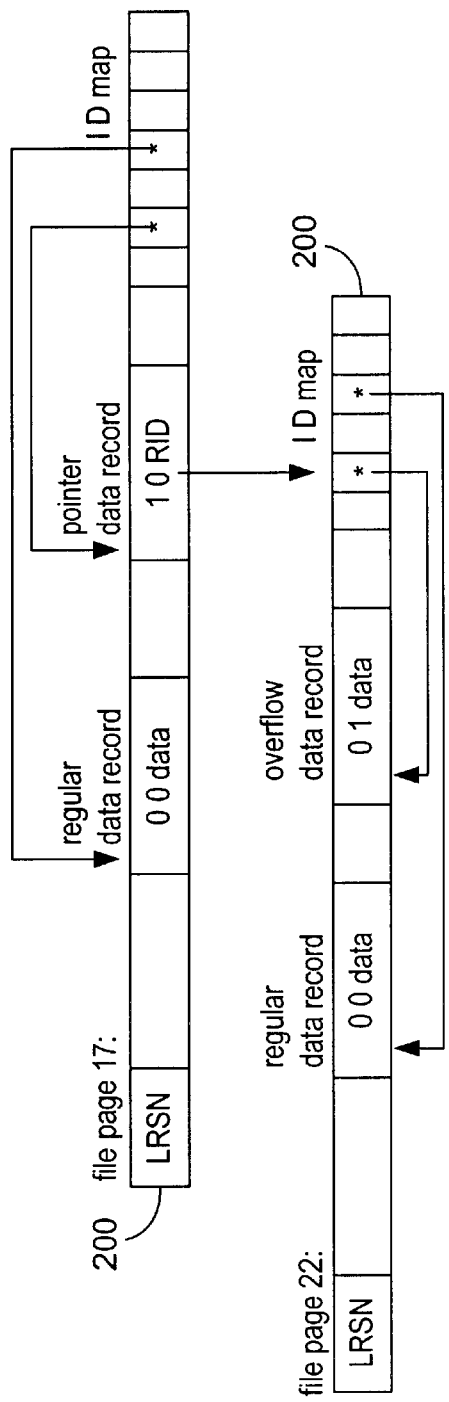
FIG. 2 shows the structure of file pages according to the preferred embodiment of the present invention.

The DBMS 106 divides a table 108 space into units called file pages. FIG. 2 shows the structure 200 of file pages. The header of each file page includes the LRSN of the most recently written log entry that corresponds to writing of that page. A file page contains zero or more data records, which the DBMS 106 allocates at the beginning of the page (after the header). Deletion of records can cause gaps between remaining records. The end of a file page contains an ID map, which is an array of pointers (offsets of data records within the page). The term "slot" is used to mean the place (if any) to which an ID map entry points.

An ID map helps identify records. In DB2 and several other DBMS's that use the SQL[1] database language, not every table 108 has a unique key (a set of columns that identifies rows). Therefore, file pages, entries in the log, and indices 110 (structures that speed access to records) cannot use a key for identification. Instead, they use a record's record identifier (RID), which contains the record's page number and the offset of the record's entry in the ID map. A record's RID can change only during reorganization.

There are effects on storage structures during insertion of a row or during growth by update (modification) of a variable-length column of an existing row. During these operations, if the desired page lacks enough contiguous free space (the space available for insertions and growth), the DBMS 106 compacts the page to make its free space contiguous. During compaction, when the DBMS 106 moves a record, the DBMS 106 updates the ID map's pointer to the record; compaction does not change the record's RID. If compaction produces enough free space, the data goes into the desired page.

If such compaction does not produce enough space, the data goes into another page. On an insertion, a new record goes into that other page. On growth by update of existing data, the data moves into a new overflow data record in the other page, and the existing data record in the original page becomes a pointer data record, which contains the RID of the new overflow data record. Thus, the DBMS 106 sometimes implements a row by two records (a pointer record and an overflow record). Data records that do not involve overflow (hopefully, most data records) are regular data records.

In FIG. 2, file page 17 contains a regular data record and a pointer data record. File page 22 contains a regular data record and an overflow data record. The pointer record in page 17 contains the RID of the overflow record in page 22. The two bits in the header of each data record in FIG. 2 indicate whether the record is a pointer and whether it is an overflow, respectively.

2.1.2 Storage Structures for Indices

A table 108 has zero or more indices 110, each of which uses an associated key (set of columns). For example, an employee table 108 might have an index 110 whose key is the table's 108 department number, an index 110 whose key is social security number, and an index 110 whose key is the combination of last name and first name. Within an index 110, the DBMS 106 maintains the key values in sorted order. Defining a key to be unique means that no two rows can have the same values in the key columns.

Figure 3:
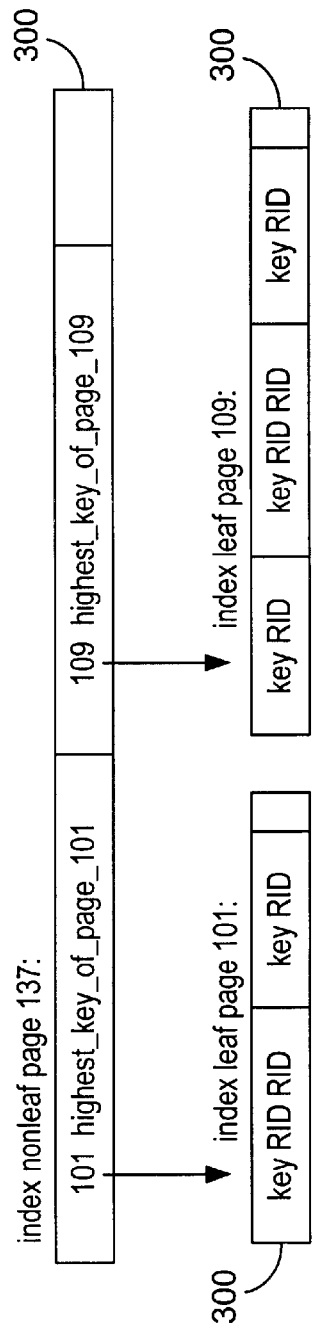
FIG. 3 shows the structure of index pages according to the preferred embodiment of the present invention.

The DBMS 106 divides the storage of an index 110 into units called index 110 pages. FIG. 3 shows the structure 300 of index 110 pages, which the DBMS 106 arranges in a hierarchy. In this example, the index 110 pages that are numbered 101 and 109 are leaves of the hierarchy, and index 110 page 137 is a nonleaf. Each entry in a leaf page contains a key value and a list of RIDs whose records have that key value. The DBMS 106 designer (or, in some DBMS's, the database designer) optionally specifies that the DBMS 106 will sort each list by RID.

Each entry in a nonleaf page points to another nonleaf page or a leaf page, although this simple figure shows no entries that point to other nonleaf pages. Each entry in a nonleaf page also contains the value of the highest key of the page to which the entry points. For example, the first entry in index 110 page 137 contains 101 (the number of another index 110 page) and the highest key value of page 101. The second entry contains corresponding information for page 109. A possible alternative implementation is for each entry in a nonleaf page to contain the value of the lowest key of the page after the page to which the entry points.

For each table 108, the database designer declares at most one index 110 as a clustering index 110. In reorganization (and, whenever possible, in subsequent insertions), the assignment of data records to file pages reflects the data records' order in the key of the clustering index 110. For example, the records having the first few values of the key might reside (be stored) in one file page, the records having the next few values might reside in a second file page, etc. This clustering speeds some queries.

The database designer optionally declares the clustering index 110 to be a partitioning index 110. Here, the DBMS 106 divides the table 108 space (and the clustering index 110) into partitions according to values of the indexed key. The table 108 space is called a partitioned table 108 space. Partitions reside in separate files; a nonpartitioned table 108 space can reside in one file.

For a partitioned table 108 space, FIG. 4 shows an example of the clustering index 400, the table space 402, and a non-clustering index 404 (an index that is not the clustering index 400). For example, if the key of the clustering index 400 is an employee's name, partitions might cover names starting with A through F, G through M, and N through Z, respectively, as in the figure. The arrows represent RIDs in indices 400 and 404. In the set of leaf pages of the clustering index 400 for a partitioned table space 402, the RIDs for each partition are contiguous.

Within a nonclustering index 404, however, the RIDs for a partition need not be contiguous. For example, suppose that the key of a nonclustering index 404 is an employee's job title. The order of RIDs in the index 404 might be the RIDs for accountants (for all partitions), the RIDs for architects (for all partitions), the RIDs for artists (for all partitions), etc. Thus, the RIDs for a partition are scattered throughout the index 404, since some of them might be accountants, some might be architects, etc.

FIG. 4 illustrates lack of contiguity via two RIDs for the G-M partition with an intervening RID for the N-Z partition. Within each value of the index 404 key (e.g., "architect"), the RIDs might be sorted. Therefore, the RIDs for a partition might be contiguous within each key value, but they are not contiguous throughout the nonclustering index 404.

2.1.3 Structural Degradation and Offline Reorganization

The storage structures described above can degrade. One type of degradation occurs when free space becomes unevenly distributed among the file pages of a table 108 space. After subsequent insertions, the order of some records no longer reflects the clustering index 110. This type of degradation slows some queries.

A second type of degradation occurs when variable-length data grows too large to fit in its original file page. The DBMS 106 then creates an overflow in another page and makes the original record a pointer. Indices 110 still contain the RID of the original record. This causes an extra page reference and thus extra time on some queries.

Reorganization removes such structural degradation. Specifically, reorganization distributes free space evenly, removes overflows (so that each row uses just one record, not two), and clusters data. Reorganization can move records between file pages. Therefore, the page that contains the record for a row after reorganization might differ from the page or pages that contained a record or records or that row before reorganization. Offline reorganization operates by (1) unloading (copying out) the data, (2) sorting the unloaded data by clustering key, and (3) reloading the data in sorted order. Users have read-only access (i.e., they can read but cannot write the data) during steps 1 and 2; they have no access during step 3.

To start offline reorganization, a database administrator issues a command. A parameter of the command specifies the name of the table 108 space that the DBMS 106 should reorganize. For a partitioned table 108 space, another parameter, which is optional, specifies the partition to reorganize; absence of this parameter signifies reorganization of the entire table 108 space. The term "area being reorganized" (often shortened to just "area") is used to mean the table 108 space or partition on which reorganization operates.

2.2 Types of Concurrency Control

A user can choose one of these levels of isolation:

For repeatable read, a transaction holds locks until commitment. Several reads of the same data during one transaction will yield the same values.

For cursor stability, a transaction holds read-locks (if any) on only one page (per cursor [1] at a time, except when crossing a page boundary, and holds write-locks (if any) until commitment. This dramatically improves concurrency and thus throughput, but several reads of the same data during one transaction will yield different values if another user has changed that data. Also, even if a transaction is scanning an area of the database and reading each record once (e.g., to calculate the sum of all the deposits in a bank), other users' writing (e.g., transferring money from one bank account to another) can cause an inconsistent calculation. Many users choose cursor stability, but this choice requires tolerance of inconsistency or knowledge that the concurrent writing will not cause inconsistency.

Variations on these levels are possible in some DBMS's.

2.3 Types of Access

This section describes three types of access to a single table 108; although the simplifications that sometimes apply are omitted. For each type, an example query in SQL [1] is provided. In each query, the keyword "WHERE" precedes a combination of one or more predicates. A predicate is an expression whose instantiation returns "true," "false," or "unknown."

An example of a predicate is "C=39."

(1) Table 108 space scan: An example query (where table 108 T has no index 110 on column C) is:

SELECT * FROM T WHERE C=39

The DBMS 106 reads every page in the table 108 space. For each page of the table 108, it scans the ID map to find the rows.

For each row, it evaluates the WHERE clause (if any) and returns the row (to the application program) if it satisfies the clause. The DBMS 106 processes an overflow record only during the scan of the page containing its pointer.

(2) Index 110 scan: An example query (where T has an index 110 whose first column is C) is:

SELECT * FROM T WHERE (C BETWEEN 47 AND 51) . . . .

The ellipsis represents possible additional predicates in the query. The DBMS 106 scans the relevant subset of the index 110 to select the RIDs whose key values satisfy the indexed part of the predicate on C. For each selected RID, it reads the row, evaluates the remainder (if any) of the WHERE clause for that row, and returns the row if it satisfies the clause.

(3) Multiple index 110 access: An example query (where T has an index 110 on C1, an index 110 on C2, and an index 110 on C3) is:

SELECT * FROM T WHERE ((C1=68 AND C2=7) OR C3=101) . . . .

The WHERE clause includes the conjunctions and/or disjunctions of n predicates, each of which the DBMS 106 can evaluate by just scanning an index 110. This type of access involves two lists of RIDs. One list (obtained from scanning an index 110) is called the recent RID list, and the other list (built incrementally by merging the recent RID list from each index 110) is called the composite RID list.

The DBMS 106 executes these phases:

For j=1 to n, perform phases 1, 2, and 3:

1. Initialize the recent RID list to empty. Scan the relevant subset of the index 110 that enables evaluation of the jth predicate. For each RID whose key value satisfies the jth predicate, append the RID to the recent RID list.

2. Sort the recent RID list (ordered by RID) if it comes from more than one key value. In a DBMS 106 that does not order RIDs within each entry on an index 110 leaf page, sort the RID list even if it comes from just one key value.

3. If j=1, make the recent RID list the composite RID list. If j>1, merge the recent RID list into the composite RID list; i.e., calculate the intersection (for a conjunction) or union (for a disjunction).

Perform phase 4 once:

4. For each RID in the composite RID list, read the row, evaluate the remainder (if any) of the WHERE clause (for repeatable read) or the entire WHERE clause (for cursor stability), and return the row if it satisfies the clause. For cursor stability, the evaluation of the entire WHERE clause accommodates other users' possible writing into this table 108.

3.0 Advantages Over Previous Research

A survey paper [13] describes issues and surveys work in online reorganization of databases. Most of the work describes types of reorganization other than restoration of clustering (which is the type that is performed by the present invention). Some of the work deals with restoration of clustering, but most of this work in clustering does not discuss the issue of movement of data across a user's position in a scan.

Previous research in in-place online restoration of clustering requires repeatable read:

Omiecinski et al. [7, 8] describe an method for online reorganization in place. They use repeatable read with page-level locking.

Salzberg and Dimock [9] describe techniques for online changing of references to a moved record. For user transactions that perform scanning, the authors note that using repeatable read with page-level locking avoids movement of data across a user's position in a scan.

In contrast to the research above, the methods of the present invention allow, but do not require, repeatable read; they also allow cursor stability. The typical throughput using cursor stability exceeds the typical throughput using repeatable read, and many customers demand the opportunity to use cursor stability. With cursor stability, a user transaction can experience some inaccuracy due to concurrent user transactions, but customers could not tolerate the potentially massive amount of inaccuracy that could result from online reorganization in place without mechanisms to correct the inaccuracy. The reorganization's tracking of movement of records and the subsequent correction of user transactions are mechanisms that correct the inaccuracy. They allow cursor stability (with reasonably accurate results) during online reorganization in place.

One method for online restoration of clustering in DB2's structures [5, 11, 10] operates by copying data from the original copy of the area being reorganized (which users access) into a shadow copy of that area (in reorganized form). A survey paper [13] describes other methods for online reorganization by copying. Such an approach differs from our methods, which reorganize in place without making a shadow copy.

Following are disadvantages of reorganization by copying:

It can require more disk space for the area being reorganized, to store (1) the shadow copy of the area and (2) for some DBMS's, a mapping between records' RIDs in the original copy and corresponding records' RIDs in the shadow copy.

It involves a transition between directing users' accesses into the original copy and directing them into the shadow copy. This transition typically requires a period of limited or nonexistent user access.

The benefit for users (by letting them access reorganized data) begins after the transition; reorganization in place might begin the benefit immediately (as the area that users access is reorganized).

Advantages of reorganization by copying include (1) simplicity without sacrificing cursor stability and (2) reduced contention with users for access to the area being reorganized.

The novelty of the approach described herein is online restoration of clustering that is both (1) in place (to obviate extra disk space) and (2) supportive of cursor stability (for high throughput) with reasonably accurate results. There is previous work in online restoration of clustering that has just the first property or just the second, but there is no previous work that has both properties.

4.0 Concepts in the Methods

4.1 Overview of the Methods

The term reorganizer 112 is used to denote a DBMS 106 process that executes in the background to sweep through a table 108 space (or a partition of a table 108 space) and reorganize it. The methods involve any number of users and one reorganizer 112. The reorganizer 112 usually has the lowest priority in scheduling, but if the reorganizer's 112 locks have blocked a user, then the system should either preempt the reorganizer 112 or raise its allocation priority, to avoid a convoy of users waiting for the reorganizer 112.

The order in which a user's transaction accesses data or index 110 entries is the order in the table 108 space or in the index 110. At any time during a transaction, the user has reached some position in the order. Online reorganization can move records and thus change the order, and each record that moves between pages gets a new RID. Something that was ahead of the user's position can move behind, or something behind can move ahead. The methods described herein assure that if something moves, the user will access each appropriate piece of data exactly once (not twice and not zero times). Thus, the result of the transaction is consistent with the user's chosen level of isolation. This accommodation of the changed order is considered to be worthwhile, since the rate of movement by the reorganizer 112 might greatly exceed the rate of writing by regular transactions that execute concurrently with a cursor stability transaction.

4.2 States of the Reorganizer

At any time, the reorganizer 112 is operating, suspended, or finished; FIG. 5 shows a state transition diagram. For each user, the reorganizer 112 (while operating) allocates certain data to track movement of records across the user's position. In any state, users can consume data from the database and can consume data that the reorganizer 112 has allocated, and the reorganizer 112 can deallocate its data after users have consumed it. Thus, the amount of allocation increases with the reorganizer's 112 activity and decreases with users' activity.

The reorganizer 112 can switch between the operating state 500 and suspended state 502 for either of these reasons:

Reorganization suspends when a period of peak usage begins and resumes when the period ends. Another possibility is for the reorganizer 112 to pause between its steps.

To bound the allocation of main storage, reorganization suspends when its total allocation grows past a parameter-controlled size; it resumes when the allocation shrinks below another parameter-controlled size. The storage allocator (or, in an alternative implementation, the reorganizer 112) tracks this allocation and changes the reorganizer's 112 state between the operating state 500 and suspended state 502. During reorganizer 112 operation, users give a higher priority to consuming data from the database, to take advantage of locality of reference. During reorganizer 112 suspension, users give a higher priority to consuming the reorganizer's 112 data, to allow deallocation and thus availability of storage. The use of two parameters (for suspension and resumption) instead of one reduces the frequency of state-switching and thus gives users longer periods of database consumption, when they can take advantage of locality of reference.

4.3 State Information for a User

The methods of the present invention refer to a user's current position, whose definition depends on the user's type of access:

During a table 108 space scan, the position is the RID being processed.

During an index 110 scan, if the current key satisfies the query's predicate, the position is the key and the offset within the index's RID list for that key. If the key does not satisfy the predicate, the position is the end of the list for the previous satisfying key, if any.

During phase 1 of a multiple index 110 access, the position for the index 110 being scanned (and the recent RID list) is as in an index 110 scan; the position for already-scanned indices 110 (and the composite RID list) is the end of those indices 110.

During phases 2 and 3 of a multiple index 110 access, the position for all those indices 110 (and both RID lists) is the end of those indices 110.

During phase 4 of a multiple index 110 access (when the user is processing the associated data), the position is the RID in the composite RID list.

For each user, this state information (most of which is never paged out) is maintained:

The name(s) of the table(s) 108 being accessed

The type of access

The user's current position

4.4 Record Movement and Movement Lists

Four terms are used to describe the possible directions of the reorganizer's 112 movement of a record with respect to a user's position:

The record moves forward from a position behind the user (in the already-scanned area) to a position ahead of the user (in the not-yet-scanned area).

It moves backward from a position ahead of the user to a position behind the user.

It moves behind the user from one position behind the user to another position behind the user.

It moves ahead of the user from one position ahead of the user to another position ahead of the user.

When reorganization moves a record and thus changes its RID, the RID can move within the index 110 if the DBMS 106 sorts indices' 110 RID lists by RID. The same four terms are used for the directions of movement of a RID within an index 110.

Determination of the direction of movement depends on the user's type of access:

During a table 108 space scan, movement can be in any direction, depending on the user's position (RID).

During an index 110 scan, for a record whose key equals that of the user's position in the index 110, movement can be in any direction, depending on the user's position in the index 110. For a record with an earlier or later key, movement is behind the user or ahead of the user, respectively.

During phase 1 of a multiple index 110 access, for the index 110 being scanned (and the recent RID list), movement is as in an index 110 scan.

During phases 2 and 3 of a multiple index 110 access, for the index 110 being scanned (and the recent RID list), movement is behind the user.

During phases 1, 2, and 3 of a multiple index 110 access, for already-scanned indices 110 (and the composite RID list), movement is behind the user. For not-yet-scanned indices 110, movement is ahead of the user.

During phase 4 of a multiple index 110 access, movement can be in any direction, depending on the user's position (RID) in the composite RID list.

For each user, the reorganizer 112 maintains movement lists to track the reorganizer's 112 movement of records that the user might access. The type of access determines the types of movement lists (forward and backward ordered lists or differential lists). The lists' structures and operations are explained below; Section 5 discusses how to use the lists, thus clarifying the reasons for the structures and operations.

4.5 Forward and Backward Ordered Lists

Figure 6:
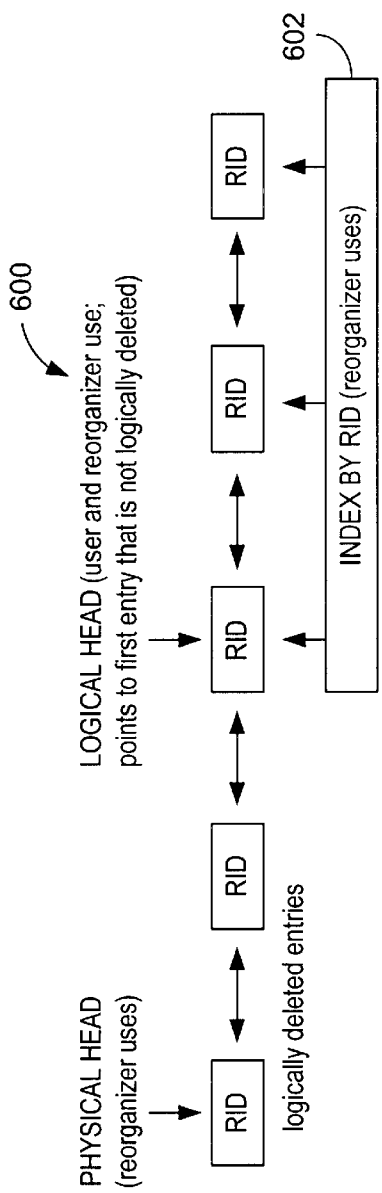
FIG. 6 shows the structure of a forward ordered list (FOL) according to the preferred embodiment of the present invention.

Forward and backward ordered lists are used for users performing a table 108 space scan, an index 110 scan, or phase 4 of a multiple index 110 access. FIG. 6 shows the structure of a forward ordered list (FOL) 600, which tracks records that the reorganizer 112 moves forward; the user has already processed them. Each user has at most one FOL 600, which is a doubly linked list, ordered by RID and indexed. Each entry contains the new RID of a moved record. The logical head points to the first entry that is not logically deleted; the physical head might point to a logically deleted entry. When a RID is in a FOL 600, it means that the FOL 600 contains an entry that has that RID and is not logically deleted. The system tries to arrange for the beginning part of the FOL 600 (which probably matches the user's current file page) to be in main storage; the rest of the FOL 600 might be paged out.

These are the operations on a FOL 600; they maintain the FOL's 600 order, heads, and index 602 when necessary:

Determine whether a RID has an entry in the FOL 600 (reorganizer 112 invokes, using index 602).

Change a RID in an existing entry (reorganizer 112 invokes).

Read the RID of the entry to which the logical head points (user invokes): This returns null if the head is null.

Logically and physically insert an entry (reorganizer 112 invokes).

Logically and physically delete an entry (reorganizer 112 invokes).

This includes deallocation of storage.

Logically delete the first entry (user invokes): Advance the logical head.

Collect garbage (reorganizer 112 invokes):
  Do until physical head=logical head;
  Advance physical head;
  Deallocate storage of the formerly physically first entry;
  End;

A backward ordered list (BOL) tracks records that the reorganizer 112 moves backward; the user has not yet processed them. Each user has at most one BOL. Its structure and operations are like those of a FOL 600, as illustrated in FIG. 6.

Without online reorganization, a user transaction scans a list of RIDs (in a table 108 space, an index 110, or a RD list) and processes each record whose RID it finds. With online reorganization, the transaction omits redundant processing of records whose RIDs appear in the FOL 600 (since it has already processed them). It also eventually scans the BOL and processes the records whose RIDs appear there (since its scan of data would never find those records).

Figure 7:
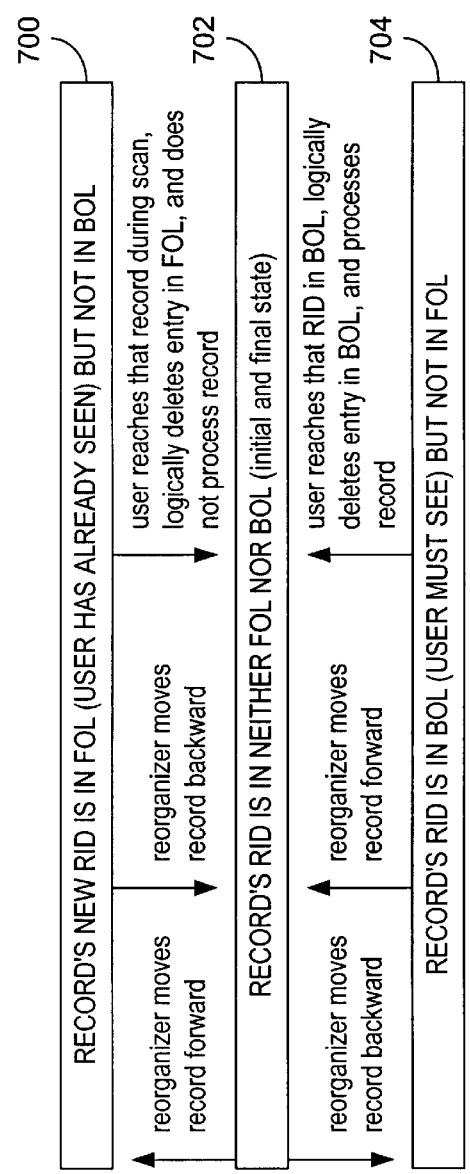
FIG. 7 shows a state transition diagram for each record that a user will eventually process according to the preferred embodiment of the present invention.

FIG. 7 shows a state transition diagram for each record that a user will eventually process, including the possible states 700, 702, 704 of a record.

4.6 Differential Lists

A differential list (DL 800) tracks records that the reorganizer 112 moves forward, backward, or behind the user. DLs 800 are used for users performing phase 1, 2, or 3 of a multiple index 110 access. A user transaction's RID list can become invalid if, for example, the reorganizer 112 moves a record from a slot whose RID is in the RID list (thus changing the record's RID). Applying a differential list to a RID list will correct such invalidity in the RID list.

Figure 8:
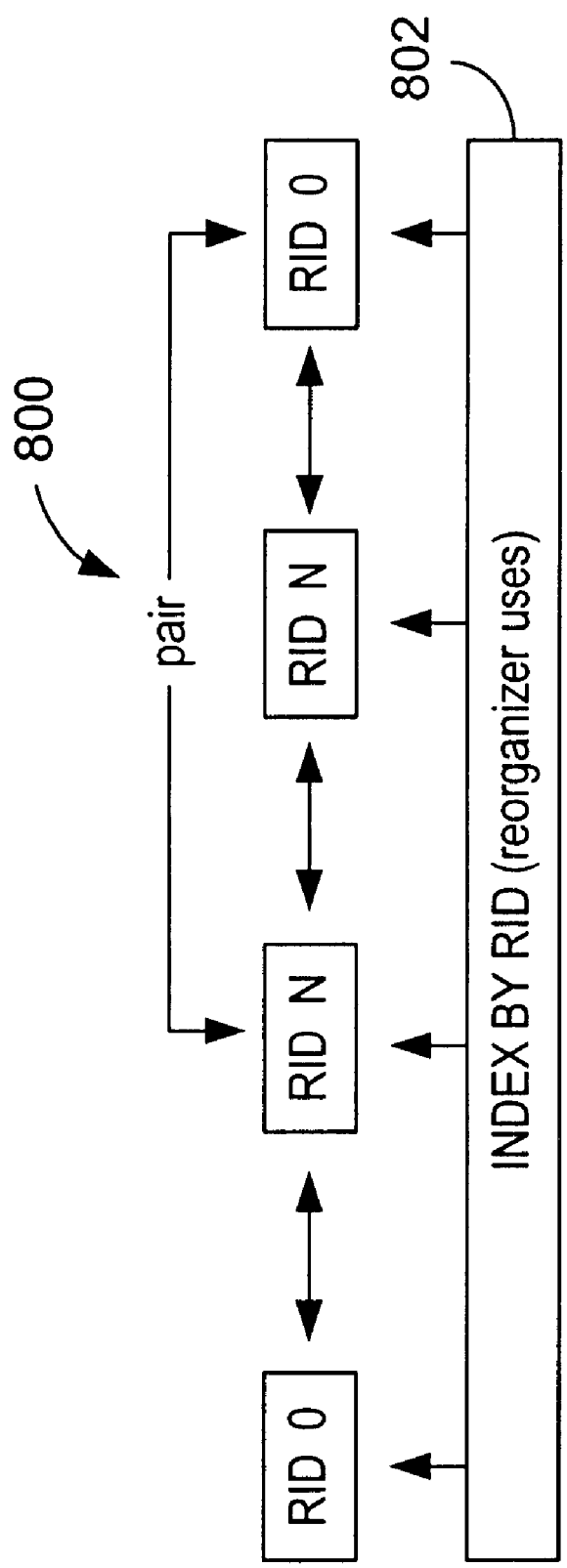
FIG. 8 illustrates the structure of a differential list according to the preferred embodiment of the present invention.

For each RID list (recent or composite), a user has a corresponding DL 800, which is a doubly linked list that the reorganizer 112 maintains. FIG. 8 illustrates the structure of a DL 800, an entry of which contains:

A RID

A flag (shown in the figure as "O" or "N") to tell whether the RID is an old RID (the source of a movement) or a new RID (the target)

In some but not all cases, a link to a paired entry with the opposite flag, to represent these possibilities:
O—An old entry (without a paired new entry) contains the old RID of a record that the reorganizer 112 moves forward. See the first entry in the figure.
N—A new entry (without a paired old entry) contains the new RID of a record that the reorganizer 112 moves backward. See the third entry in the figure.
O-N—Two paired entries together contain the old and new RIDs of a record that the reorganizer 112 moves behind the user. See the second and fourth entries in the figure.

A DL 800 is ordered by RID, with old and new entries interleaved.

A user transaction corrects a RID list by making a local copy of the corresponding DL 800 and then inserting new entries and deleting old entries in the RID list. Since a user extracts RIDs from only the part of an index 110 that satisfies an index 110 predicate, forward or backward movement can occur only for a record that satisfies the predicate.

Therefore, an unpaired entry (either old or new) in a DL 800 represents a record that satisfies the predicate. However, movement behind the user can occur for a satisfying or an unsatisfying record. Therefore, a pair of entries represents a satisfying record only if the user's RID list includes the old RID. This fact requires the pairing; a user transaction should insert a paired new RID into a RID list only if the RID list already contains the paired old RID (which it should delete).

When the reorganizer 112 moves a record, the corresponding modification of a DL 800 can be complex. At any time, any RID (e.g., the RID for the slot of the source of the move or the RID for the target) is in any of several possible states (with respect to a DL 800).

Three formats are used to describe the behavior of a DL 800:

A diagram shows the transitions among a RID's states. Each state has a state number.

A chart shows the post-move states for each possible pair of (1) pre-move state of the move's source and (2) pre-move state of the move's target. The chart refers to the state numbers.

Each operation on a DL 800 has a detailed description, which includes justifying comments and refers (when appropriate) to the chart's rows and columns.

The next three sections present the three formats. Most of the transitions in the state transition diagram are derived from the chart. Almost all of the contents of the chart are derived from the operations. The descriptions of operations contain all the necessary information; the diagram and chart were added only for clarity.

4.6.1 Transitions Among a RID's States

With respect to a DL 800, a RID can be in any of several states, depending on the entries (if any) for that RID in that DL 800, whether the RID is behind or ahead of the user's position in the corresponding index 110, and whether the slot for that RID contains a record.

Figure 9:
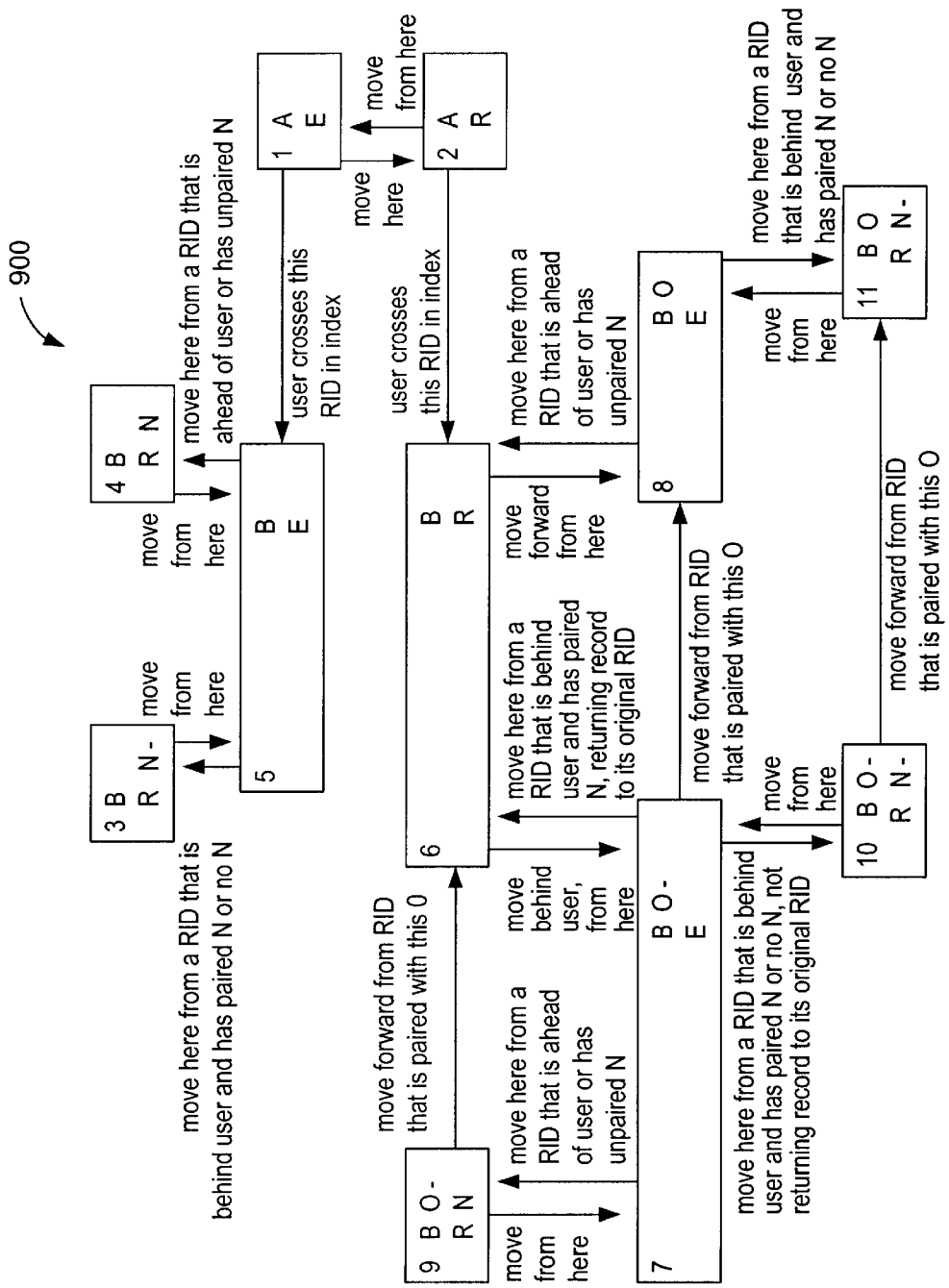
FIG. 9 shows a diagram for the states of a record ID (RID) according to the preferred embodiment of the present invention.

FIG. 9 shows a diagram 900 for the states of a RID. The rectangle for a state shows the state number and the four components of a state:

Whether the RID is behind ("B") or ahead of ("A") the user's position

Whether the slot for the RID contains a record ("R") or is empty ("E")

Whether the DL 800 contains a paired old entry ("O-"), an unpaired old entry ("O"), or no old entry (no "O") for the RID Whether the DL 800 contains a paired new entry ("N-"), an unpaired new entry ("N"), or no new entry (no "N") for the RID The possible initial states (when the DBMS 106 creates the DL 800) are 1 and 2 (if the DL 800 is for the index 110 that the user is now scanning or will scan) or 5 and 6 (otherwise). States 3–11 are the possible final states (when the user performs the operation that copies the DL 800 into a local copy); these states (i.e., all except 1 and 2) are also the states in which the RID is behind the user's position. Since the user locks an index 110 entry while reading it, the reorganizer 112 cannot concurrently move that entry's record (and thus change its RID's status in a DL 800), so the diagram omits states in which the user's position is exactly at the RID. The diagram contains only the states that are reachable from the initial states; unreachable states are ignored, of course. For each transition between states, the diagram shows an arrow, with text that describes the circumstances under which the transition occurs.

4.6.2 States of a Pair of RIDs (Source and Target) During Movement

The reorganizer's 112 movement of a record changes both of these:

The state of the RID of the source of the move (with respect to a DL 800)

The state of the RID of the target of the move (with respect to a DL 800).

FIG. 10 shows an associated chart 1000 for the states of a pair of RIDs (source and target). The columns in FIG. 10 represent the possible pre-move states of the target of the move (the states in which the RID's slot does not yet contain a record). The center of the right side of each column header shows whether the RID has an old (O) entry or no entry. The state number appears below this indication. Any paired entry (for another RID) appears above the indication; the arrow goes from O to N (the direction of movement). Thus, in state 7, the RID has an O entry, which is paired with a different RID's N entry. In state 1, the RID is ahead of the user, and in states 5, 7, and 8, the RID is behind the user. The rows represent the possible pre-move states of the source of the move (the states in which the RID's slot already contains a record). The center of the bottom of each row header shows whether the RID has an old (O) entry, a new (N) entry, both, or neither. If the RID has both, the N is above the O. The state number appears to the right of this indication. Any paired entries (for other RIDs) appear to the left of the indication. In state 10, the O and N at the left are not for the same RID. In state 2, the RID is ahead of the user, and in states 3, 4, 6, 9, 10, and 11, the RID is behind the user.

In each intersection cell, the right side shows the post-move state of the target, and the bottom shows the post-move state of the source. For example, in the intersection of row 6 and column 8, a record has moved from a source slot (whose RID's state, at the bottom, has changed from 6 to 7)

into a target slot (whose RID's state, at the right, has changed from 8 to 11). Some intersections in column 1 contain two cells (two pairs of post-move states), since the states depend on whether the RID whose O is paired with the N in the source also had an unpaired N. Similarly, some intersections in column 7 contain two cells, since the states depend on whether a record is returning to its original RID.

The chart does not explicitly show states of RIDs whose entries are paired with the source or target of the move. Also, the chart does not model the user's crossing of a RID during a scan. Therefore, the chart omits some of the state transitions of FIG. 9. For almost every transition of FIG. 9, several intersections of the chart show the transition.

In examining the chart, it is easiest to begin with the four simplest cases, in which the RID does not yet appear in the DL 800 before the movement:

Row state 2, column state 1: the only case of movement ahead of the user, Row state 2, column state 5: one case of movement backward, Row state 6, column state 1: one case of movement forward, Row state 6, column state 5: one case of movement behind the user.

4.6.3 Operations on a Differential List

The operations on a DL 800 modify the DL's 800 order and index 802 when necessary. In the following description of FIG. 10, the operations that reflect a record's movement refer (in parentheses) to state numbers in the chart's 1000 rows and columns and include justifying comments. There is no operation to change the DL 800 to reflect movement ahead of the user (row 2, column 1).

(1) Change the DL 800 to reflect forward movement (reorganizer 112 invokes; parameter is source RID):

If the DL 800 has no N entry for the source RID (row 6; column 1), insert an unpaired O entry for the source RID. Reason: This record did not move previously.

If the DL 800 has an unpaired N entry for the source RID (row 4 or 9; column 1), delete it. Reason: Movement backward and then forward resembles no movement.

If the DL 800 has a paired N entry for the source RID (row 3, 10, or 11; column 1), delete it, thus unpairing its paired O entry. Reason: Movement behind the user and then forward resembles movement forward without prior movement behind.

Also, if the DL 800 contains an unpaired N entry for the same RID as the recently unpaired O entry (left part of column 1), delete both the N and O entries for that RID. Reason: The user's RID list will already correctly include that RID, since that RID's original record and current record both satisfy the predicate. This additional deletion is omitted if the DL 800 contains a paired N entry for the same RID as the recently unpaired O entry (right part of column 1), since the current record at that RID might not satisfy the predicate.

(2) Change the DL 800 to reflect backward movement (reorganizer 112 invokes; parameter is target RID):

If the DL 800 has a paired O entry for the target RID (row 2; column 7) or no O entry for the target RID (row 2; column 5), insert an unpaired N entry for the target RID. Reason: This record did not move previously.

If the DL 800 has an unpaired O entry for the target RID (row 2; column 8), delete it. Reason: Movement forward and then backward (for the same record or a different satisfying record) resembles no movement. This cannot be done for a paired O entry (column 7), since the original record at that RID might not satisfy the predicate, so the user's RID list might not include that RID.

(3) Change the DL 800 to reflect movement behind the user (reorganizer 112 invokes; parameters are source and target RIDs):

If the DL 800 has no N entry for the source RID (row 6; column 5, 7, or 8), insert a pair of an O entry for the source RID and an N entry for the target RID. Reason: This record did not move previously.

If the DL 800 has an unpaired N entry for the source RID (row 4 or 9; column 5, 7, or 8), delete it. Also:

If the DL 800 has a paired O entry for the target RID (column 7) or no O entry for the target RID (column 5), insert an unpaired N entry for the target RID. Reason: Movement backward and then behind into a RID that was already the source of a movement behind (i.e., a RID with a paired O entry) resembles the latter movement behind followed by the movement backward. Movement backward and then behind into a RID that had no movement (i.e., a RID with no O entry) resembles one movement backward into that RID.

If the DL 800 has an unpaired O entry for the target RID (column 8), delete the O entry for the target RID. Reason: Movement backward and then behind into a RID that was already the source of a movement forward (i.e., a RID with an unpaired O entry) resembles movement forward and then backward, which resembles no movement.

If the DL 800 has a paired N entry for the source RID (row 3, 10, or 11; column 5, 7, or 8), delete it. Also:

If the deleted N entry's formerly paired O entry is for the target RID (left part of column 7), delete that O entry. Reason: Returning a record to its original RID resembles no movement.

If the formerly paired O entry is not for the target RD (column 5 or 8 or right part of column 7), insert an N entry for the target RID, paired with the formerly paired O entry. Reason: Two movements behind the user constitute one combined movement behind the user.

(4) Copy the DL 800 into a local copy, and logically delete the original DL 800 (user invokes).

(5) Collect garbage (reorganizer 112 invokes on logically deleted DL 800): Deallocate storage.

Following is the reason for maintaining two DLs 800 (for the recent and composite RID lists): The placement of entries in a DL 800 depends upon the movement of records across a user's current position. A record might move across a user's current position in the index 110 that the user is scanning now, but it cannot move across the user's current position in an already-scanned index 110, since the user's "current" position is at the end of that index 110.

5.0 The Methods

Following is a description of the reorganization methods using flowcharts to illustrate the methods.

5.1 The Method for the Reorganizer

In effect, the reorganizer 112 scans the clustering index 110, and the reorganizer's 112 current position is defined as the current key and the offset within the index's RID list for that key. Section 4.3 contains a similar definition of the position of a user performing an index 110 scan. The description of the reorganizer's 112 method will apply comparison operators (e.g., ">") to positions; such a comparison involves comparing the keys, and, if the keys are identical, comparing the offsets. Incrementing the reorganizer's 112 position is defined as incrementing the offset, and, if there is no next RID, moving to the next key (if any).

Figure 11:
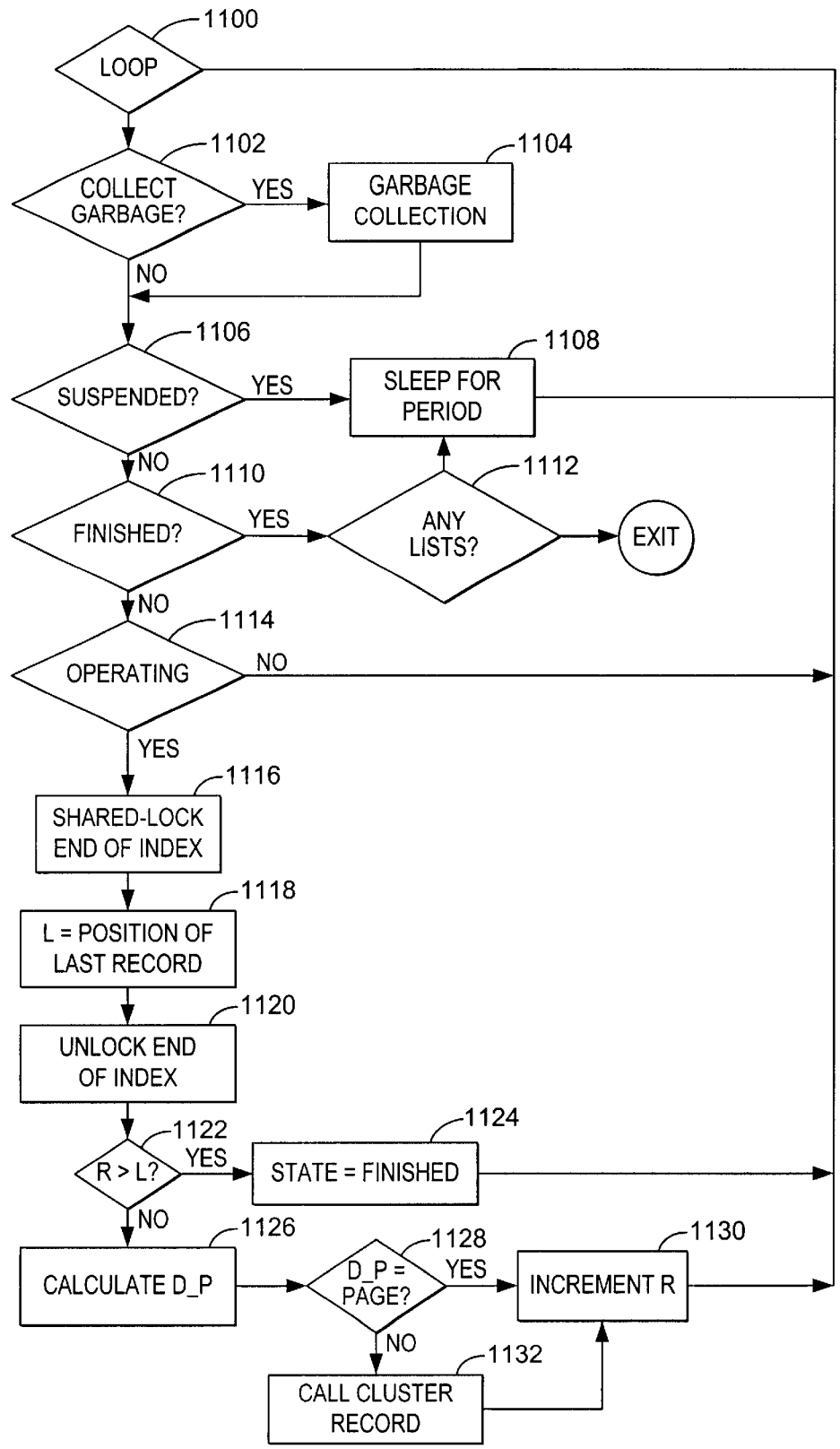
FIG. 11 is a flowchart if the main loop used by the reorganizer according to the preferred embodiment of the present invention.

FIG. 11 is a flowchart of the main loop used by the reorganizer 112.

Block 1100 is a decision block that represents the main loop.

Block 1102 is a decision block that determines whether there is any garbage collection ready to be performed. If so, control transfers to Block 1104, which performs the garbage collection; otherwise, control transfers to Block 1106. Note that, if the reorganizer 112 is operating, a possible alternative (instead of checking for garbage collection in every iteration of the main loop) is checking for garbage collection once in every few iterations of the main loop.

Block 1106 is a decision block that determines whether the state of the reorganizer 112 is "suspended". If so, control transfers to Block 1108, which causes the loop to "sleep" for a parameter-controlled period before returning to Block 1100; otherwise, control transfers to Block 1110.

Block 1110 is a decision block that determines whether the state of the reorganizer 112 is "finished". If so, control transfers to Block 1112; otherwise, control transfers to Block 1114.

Block 1112 is a decision block that determines whether any movement lists exist. If so, control transfers to Block 1108; otherwise, the loop is exited.

Block 1114 is a decision block that determines whether the state of the reorganizer 112 is "operating". If not, control transfers to Block 1100; otherwise, control transfers to Block 1116.

Block 1116 represents a shared lock being applied to the end of the clustering index for the table being reorganized.

Block 1118 represents a variable L being assigned the position in the clustering index of the logically last record in the index.

Block 1120 represents the unlocking of the end of the clustering index for the table being reorganized.

Block 1122 is a decision block that determines whether R>L, where R is the position of the reorganizer 112; initially, this is at the beginning of the clustering index. If so, control transfers to Block 1124; otherwise, control transfers to Block 1126.

Block 1124 represents the state of the reorganizer 112 being set to "Finished." Thereafter, control transfers to Block 1100.

Block 1126 represents D_P (Desired Page for R) being calculated, which is based on the size of R, page size, size of earlier records, desired frequency of free pages, desired percent of free space per page, etc.

Block 1128 is a decision block that determines whether D_P is the current page for R. If so, control transfers to Block 1130; otherwise, control transfers to Block 1132.

Block 1130 represents R being incremented. Thereafter, control transfers to Block 1100.

Block 1132 represents the procedure CLUSTER_RECORD being called with the RID of R and D_P as its parameters. Thereafter, control transfers to Block 1130.

5.1.1 Performing the Restoration of Clustering

In the following procedure to cluster a record on a page, sometimes the system must first make room for the record by moving other records off the page. Since it is assumed that an overflow record does not point back to its pointer record, the system could not efficiently find the pointer for an overflow record (to update the pointer if the system moved its overflow). Therefore, the system does not move overflow records off the page when it needs to make room. If the DBMS 106 uses back pointers, this restriction is omitted.

Figure 12:
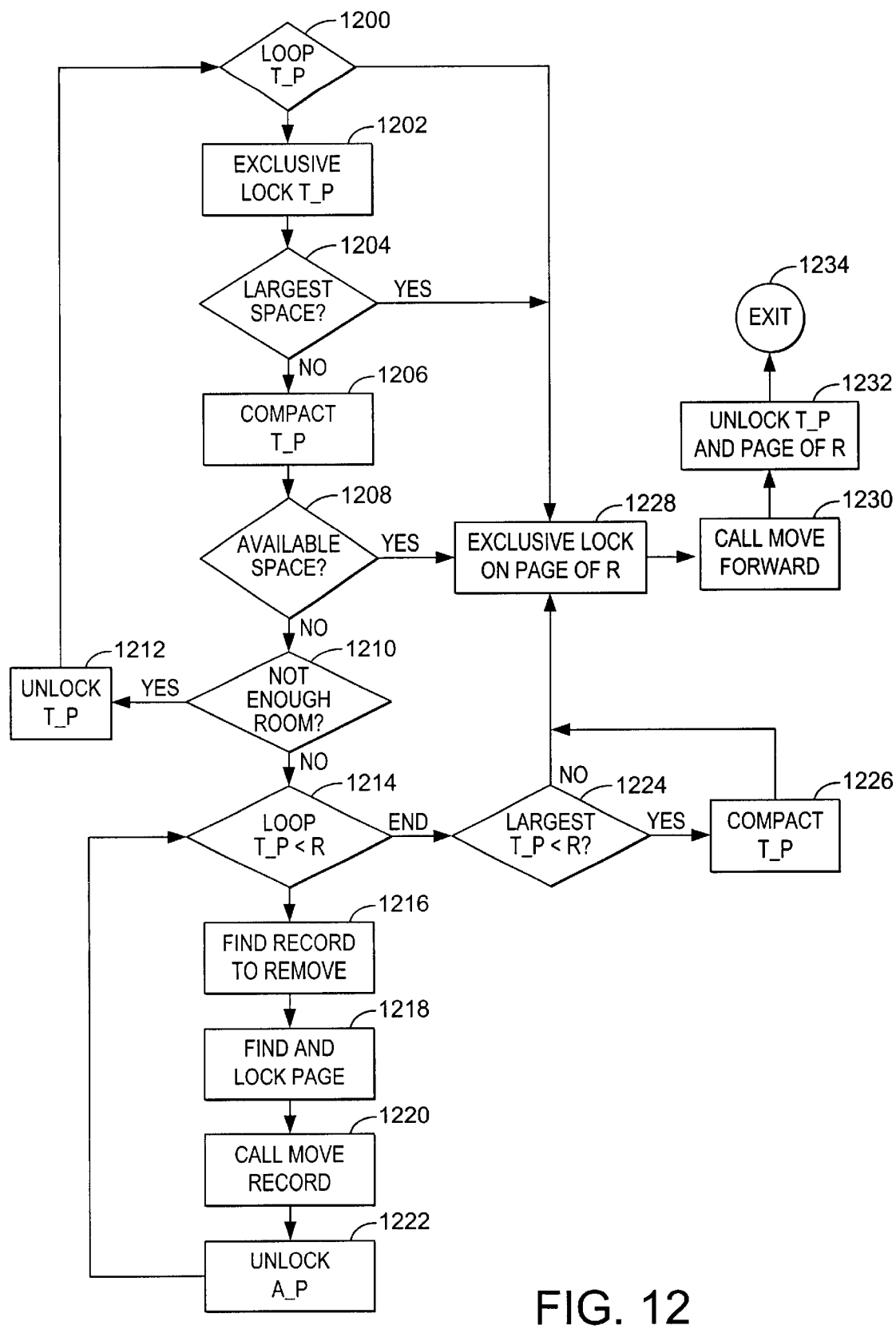
FIG. 12 is a flowchart of the CLUSTER_RECORD procedure according to the preferred embodiment of the present invention.

FIG. 12 is a flowchart of the CLUSTER_RECORD procedure, which has as its parameters, R and D_P. This procedure clusters record R, preferably on desired page D_P.

The loop in this procedure initially tries the desired page D_P. For each tried page T_P, it tests for enough space, and if there is not enough space, the next iteration tries page T_P+1. Instead of iterating to the next page, the method could attempt to find a "nearby" page. For example, record R could be put on a page that contains a record with the same key, or if the record has a unique key, a record with a neighboring key. Another alternative is to put all such records at the end of the table space.

Block 1200 is a decision block that represents a loop comprising T_P=D_P to the last page of the table 108 space. This loop finds the target page, T_P, for clustering. Upon completion of the loop, control transfers to Block 1228; otherwise, control transfers to Block 1202.

Block 1202 represents an exclusive lock being applied to T_P.

Block 1204 is a decision block that determines whether the largest available space on T_P is greater than or equal to the size of parameter R. If so, control transfers to Block 1228; otherwise, control transfers to Block 1206.

Block 1206 represents T_P being compacted to make free space contiguous.

Block 1208 is a decision block that determines whether the available space on T_P is greater than or equal to the size of parameter R. If so, control transfers to Block 1228; otherwise, control transfers to Block 1210.

Block 1210 is a decision block that determines whether the available space on T_P plus the total space of non-overflow records on T_P that logically follow R is greater than or equal to the size of parameter R. If not, control transfers to Block 1212; otherwise, control transfers to Block 1214.

Block 1212 represents T_P being unlocked. This Block is reached when R cannot be put on T_P, and thus an iteration must occur.

Block 1214 is a decision block that represents a loop that iterates while available space on T_P is less than the size of parameter R. Upon completion of this loop, control transfers to Block 1224. This Block is reached when removing records from this page will succeed in providing enough space for R.

Block 1216 represents finding a non-overflow record A_R to be removed on T_P.

Block 1218 represents finding and applying an exclusive lock on another page A_P with space for record A_R.

Block 1220 represents the procedure MOVE_RECORD being called with the parameters A_R and A_P.

Block 1222 represents A_P being unlocked. Thereafter, control transfers to Block 1214.

Block 1224 is a decision block that determines whether the largest available space on T_P is less than the size of R. If so, control transfers to Block 1226; otherwise, control transfers to Block 1228.

Block 1226 represents T_P being compacted. Thereafter, control transfers to Block 1228.

Block 1228 represents an exclusive lock being applied to the page of R.

Block 1230 represents the procedure MOVE_RECORD being called with the parameters R and T_P.

Block 1232 represents T_P and the page of R being unlocked.

Finally, the procedure exits at 1234.

Figure 13A:
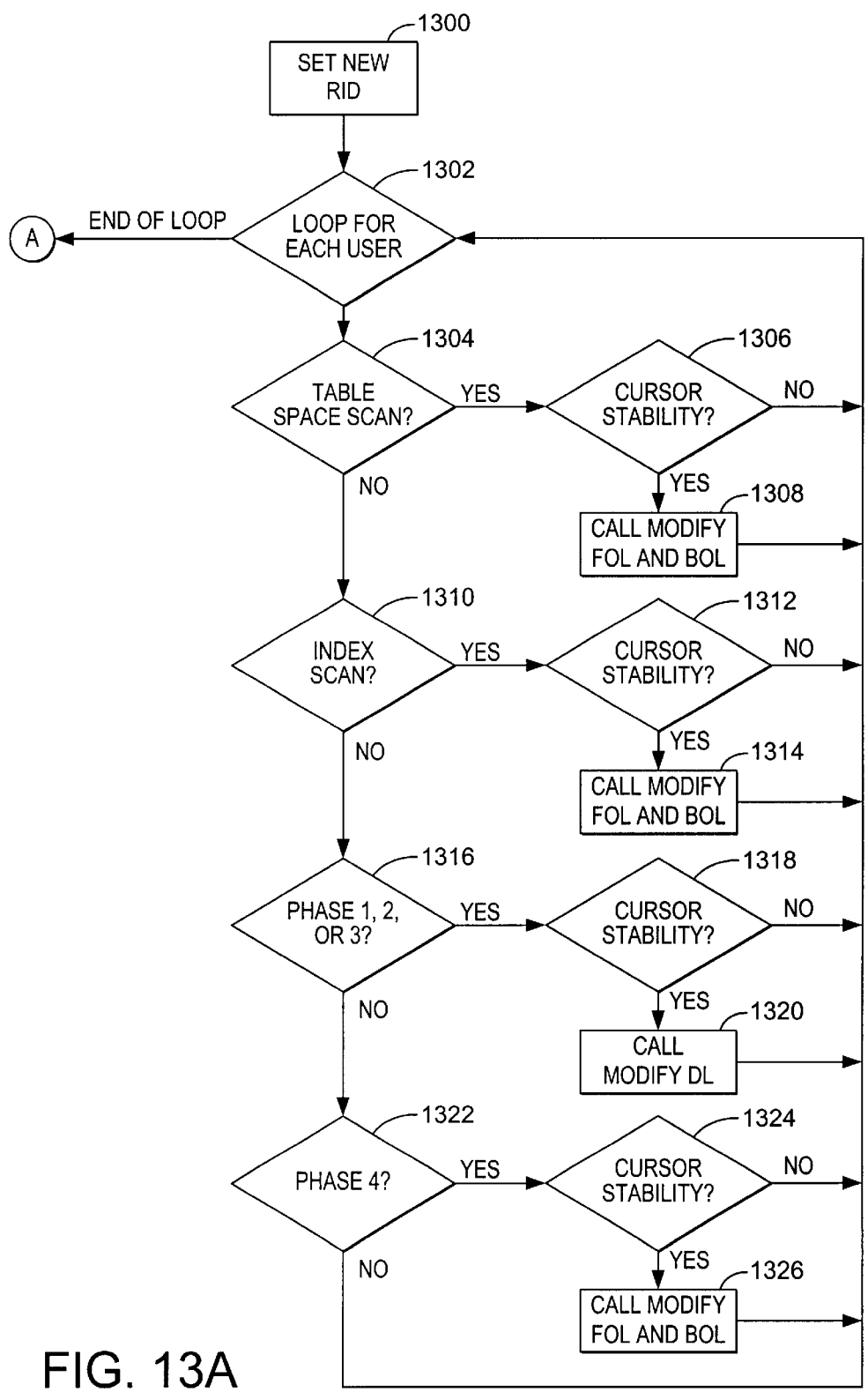
FIGS. 13A and 13B together are a flowchart of the MOVE_RECORD procedure according to the preferred embodiment of the present invention.
Figure 13B:
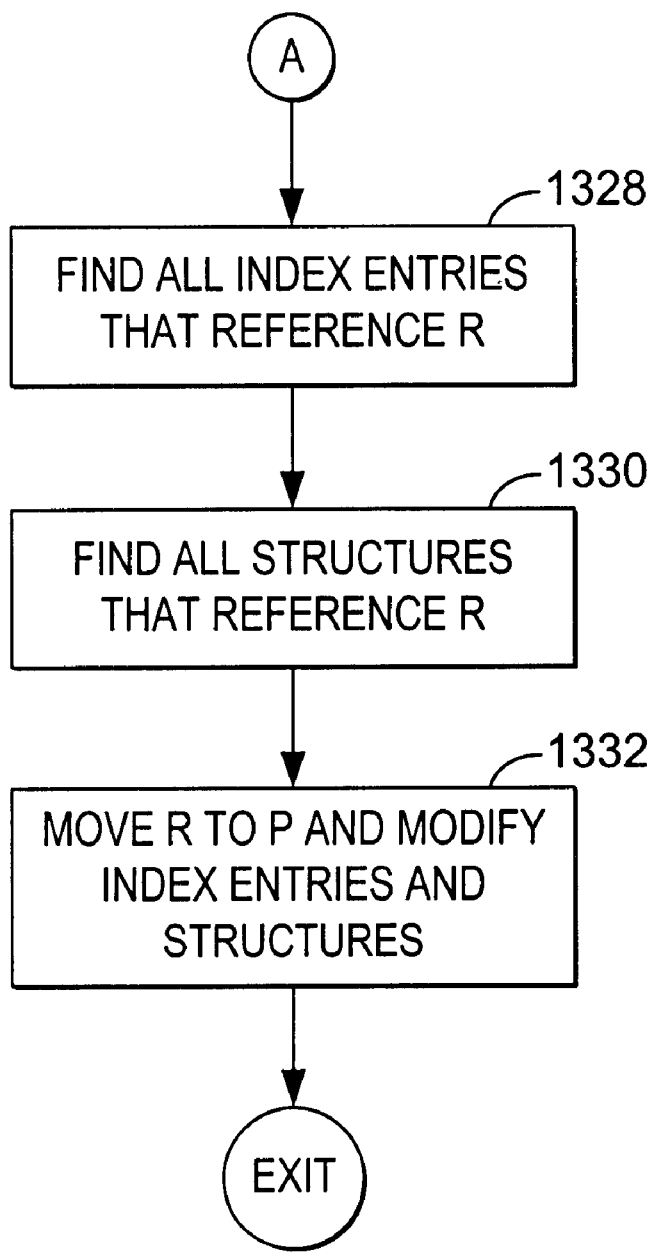

FIGS. 13A and 13B together are a flowchart of the MOVE_RECORD procedure, which has as its parameters, R and P. This procedure moves record R to page P.

Block 1300 represents the variable NEW_RID being assigned the first available offset in page P's ID map.

Block 1302 is a decision block that represents a loop for each user. Upon completion of the loop, control transfers to FIG. 13 B via "A".

Block 1304 is a decision block that determines whether the user's type of access comprises a table space scan. If so, control transfers to Block 1306; otherwise, control transfers to Block 1310.

Block 1306 is a decision block that determines whether cursor stability is in effect. If so, control transfers to Block 1308; otherwise, control transfers to Block 1302.

Block 1308 represents the procedure MODIFY_FOL_AND_BOL being called with the parameters USER_ID, R, and NEW_RID. Thereafter, control transfers to Block 1302.

Block 1310 is a decision block that determines whether the user's type of access comprises an index scan. If so, control transfers to Block 1312; otherwise, control transfers to Block 1316.

Block 1312 is a decision block that determines whether cursor stability is in effect. If so, control transfers to Block 1314; otherwise, control transfers to Block 1302.

Block 1314 represents the procedure MODIFY_FOL_AND_BOL being called with the parameters USER_ID, R, and NEW_RID. Thereafter, control transfers to Block 1302.

Block 1316 is a decision block that determines whether the user's type of access comprises Phase 1, 2, or 3 of a multiple index access. If so, control transfers to Block 1318; otherwise, control transfers to Block 1322.

Block 1318 is a decision block that determines whether cursor stability is in effect. If so, control transfers to Block 1320; otherwise, control transfers to Block 1302.

Block 1320 represents the procedure MODIFY_DL being called with the parameters USER_ID, R, and NEW_RID. Thereafter, control transfers to Block 1302.

Block 1322 is a decision block that determines whether the user's type of access comprises Phase 4 of a multiple index access. If so, control transfers to Block 1324; otherwise, control transfers to Block 1302.

Block 1324 is a decision block that determines whether cursor stability is in effect. If so, control transfers to Block 1326; otherwise, control transfers to Block 1302.

Block 1326 represents the procedure MODIFY_FOL_AND_BOL being called with the parameters USER_ID, R, and NEW_RID. Thereafter, control transfers to Block 1302.

Upon completion of the loop at Block 1302, control transfers to Block 1328 via "A".

Block 1328 represents finding all the index entries that reference R.

Block 1330 represents finding all the referential integrity structures that reference R.

Block 1332 represents moving R to P, modifying the index entries, and (if necessary) modifying the referential integrity structures. If R is a pointer record, the data is moved from the overflow record to a new, regular data record. If deletion and insertion ordinarily trigger certain actions, e.g., deletion via referential integrity, those actions should not occur for record movement.

5.1.2 Maintaining the Movement Lists

This section illustrates how to maintain the movement lists. The above procedure sometimes omits the maintenance of movement lists:

For a table 108 space scan or index 110 scan, repeatable read prevents movement of a record across the user's position, so the system omits movement lists.

For a multiple index 110 access, repeatable read prevents movement of a record whose RID the user has already read, so the system omits movement lists.

Also, the procedure is presented under the assumption that the DBMS 106 sorts index 110 leaf entries by RID. If the DBMS 106 does not sort them, then the system need not maintain a movement list for an index 110 scan, since it never moves a record across the user's position.

Figure 14:
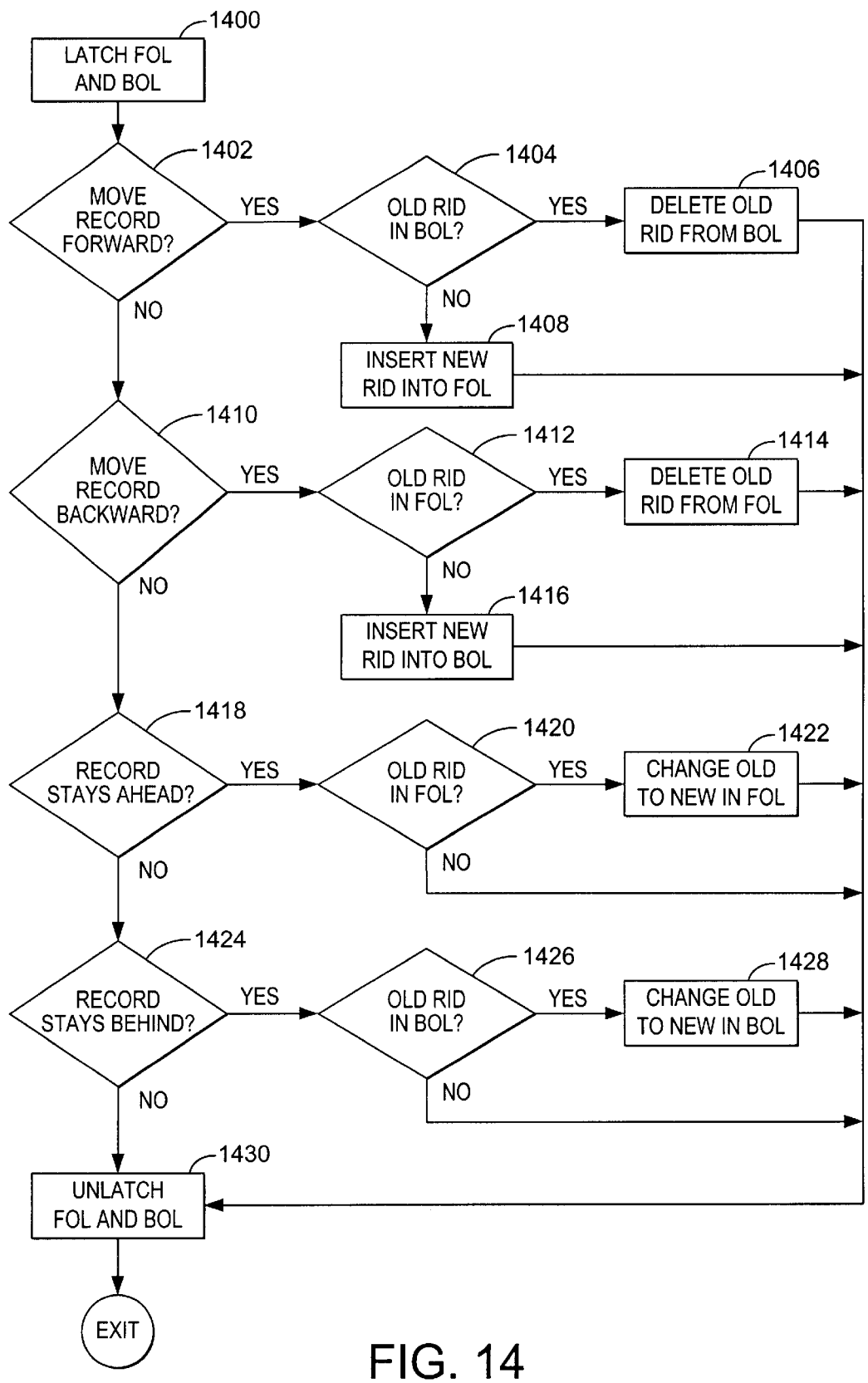
FIG. 14 is a flowchart of the MODIFY_FOL_AND_BOL procedure according to the preferred embodiment of the present invention.

FIG. 14 is a flowchart of the MODIFY_FOL_AND_BOL procedure, which has as its parameters, USER_ID, OLD_RID, and NEW_RID. This procedure modifies the FOL 600 and BOL 600 for one user. If the user is doing a table space scan, the reorganizer 112 performs FOL/BOL processing for data records; for an index scan, the reorganizer 112 performs FOL/BOL processing for index entries; and for Phase 4 of a multiple index access, the reorganizer 112 performs FOL/BOL processing for RID list entries.

Block 1400 represents the FOL 600 and BOL 600 being latched.

Block 1402 is a decision block that determines whether the record movement is forward of the user's position. If so, control transfers to Block 1404; otherwise, control transfers to Block 1410.

Block 1404 is a decision block that determines whether the old RID is in the BOL 600. If so, control transfers to Block 1406, which deletes the old RID from the BOL 600; otherwise, control transfers to Block 1408, which inserts the new RID into the FOL. Thereafter, control transfers to Block 1430.

Block 1410 is a decision block that determines whether the record movement is backward from the user's position. If so, control transfers to Block 1412; otherwise, control transfers to Block 1418.

Block 1412 is a decision block that determines whether the old RID is in the FOL 600. If so, control transfers to Block 1414, which deletes the old RID from the FOL 600; otherwise, control transfers to Block 1416, which inserts the new RID into the BOL 600. Thereafter, control transfers to Block 1430.

Block 1418 is a decision block that determines whether the record movement stays ahead of the user's position. If so, control transfers to Block 1420; otherwise, control transfers to Block 1424.

Block 1420 is a decision block that determines whether the old RID is in the FOL 600. If so, control transfers to Block 1422, which changes the old RID to the new RID in the FOL 600. Thereafter, control transfers to Block 1430.

Block 1424 is a decision block that determines whether the record movement stays behind the user's position. If so, control transfers to Block 1426; otherwise, control transfers to Block 1430.

Block 1426 is a decision block that determines whether the old RID is in the BOL 600. If so, control transfers to Block 1428, which changes the old RID to the new RID in the BOL 600. Thereafter, control transfers to Block 1430.

Block 1430 unlatches the FOL 600 and BOL 600.

Figure 15:
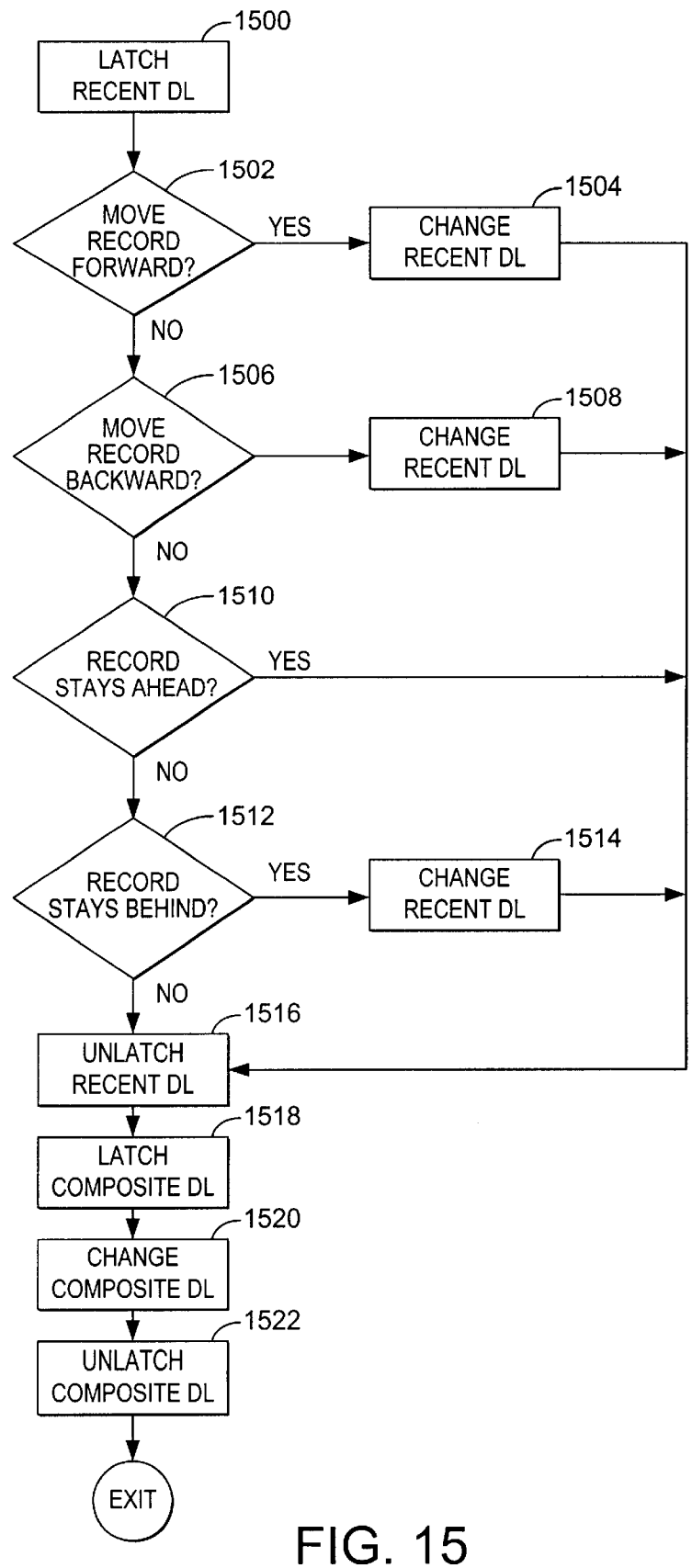
FIG. 15 is a flowchart of the MODIFY_DL procedure according to the preferred embodiment of the present invention.

FIG. 15 is a flowchart of the MODIFY_DL procedure, which has as its parameters, USER_ID, OLD_RID, and NEW_RID. This procedure modifies the DL 800 for one user. If the user is doing Phase 1 of a multiple index access, the reorganizer 112 performs DL 800 processing for the index being scanned and the recent RID list; any movement is possible. If the user is doing Phase 2 or 3 of a multiple index access, the reorganizer 112 performs DL 800 processing for the index being scanned and the recent RID list; all movement is behind the user. For Phases 1, 2, or 3 of a multiple index access, the reorganizer 112 performs DL 800 processing for already-scanned indices and the composite RID list; all movement is behind the user.

Block 1500 represents the recent DL 800 being latched.

Block 1502 is a decision block that determines whether the record movement is forward from the user's position in the index for the recent RID list. If so, control transfers to Block 1504; otherwise, control transfers to Block 1506.

Block 1504 represents the recent DL 800 being changed to reflect the forward movement.

Block 1506 is a decision block that determines whether the record movement is backward from the user's position in the index for the recent RID list. If so, control transfers to Block 1508; otherwise, control transfers to Block 1510.

Block 1508 represents the recent DL 800 being changed to reflect the backward movement.

Block 1510 is a decision block that determines whether the record stays ahead of the user's position in the index for the recent RID list. If so, control transfers to Block 1516; otherwise, control transfers to Block 1512.

Block 1512 is a decision block that determines whether the record stays behind the user's position in the index for the recent RID list. If so, control transfers to Block 1514; otherwise, control transfers to Block 1516.

Block 1514 represents the recent DL 800 being changed to reflect the movement behind.

Block 1516 represents the recent DL 800 being unlatched.

Block 1518 represents the composite DL 800 being latched.

Block 1520 represents the composite DL 800 being changed to reflect movement behind. This composite DL 800 was produced by earlier merges. The record always stays behind the user, who is already at the end of all indices that the RID list represents.

Block 1522 represents the composite DL 800 being unlatched.

5.2 The Method for a User Performing a Table Space Scan

Figure 16:
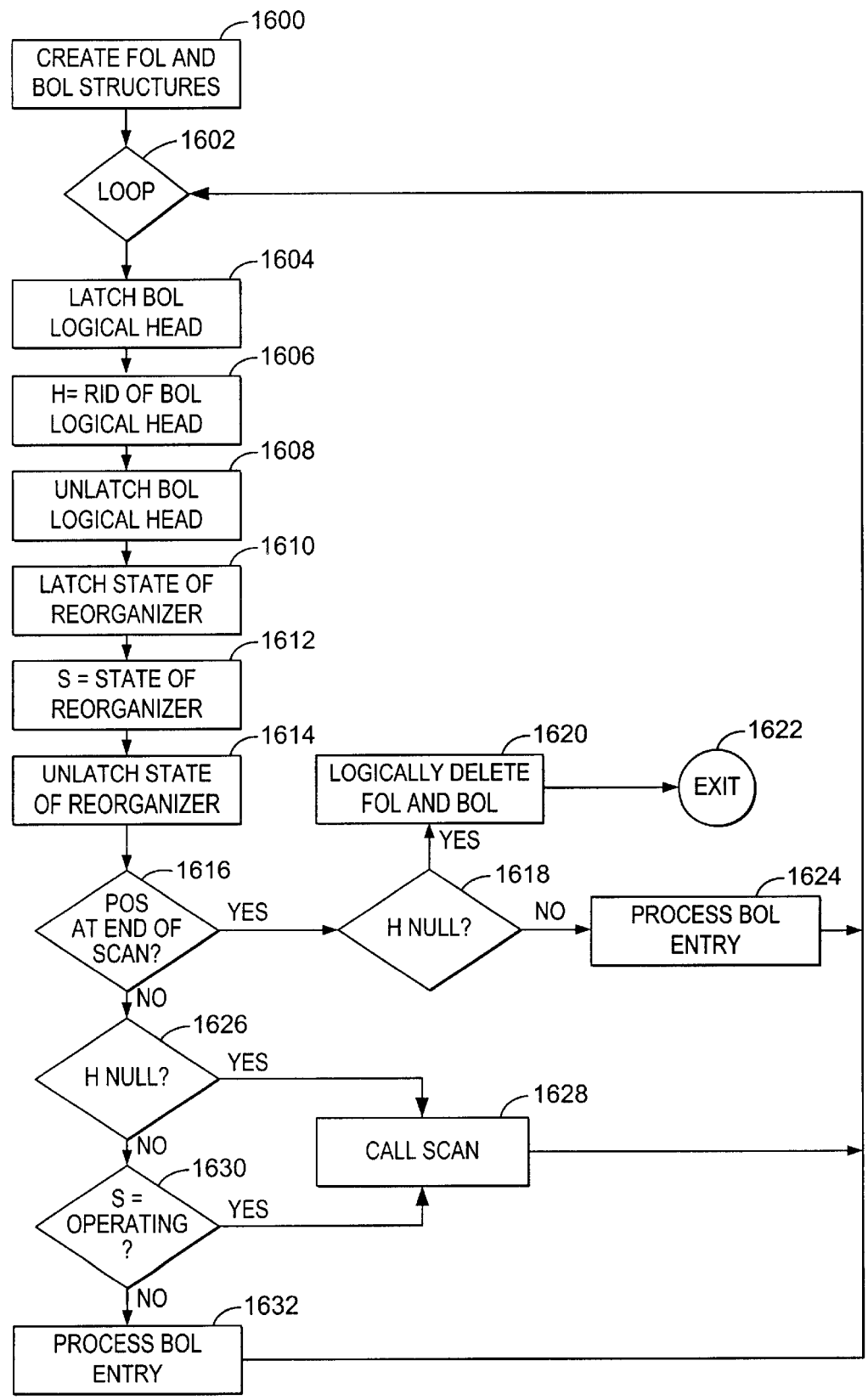
FIG. 16 is a flowchart of the logic used by a user performing a table space scan or index scan according to the preferred embodiment of the present invention.

FIG. 16 is a flowchart of the logic used by a user performing a table space scan or index scan.

Block 1600 represents the FOL 600 and BOL 600 structures being created.

Block 1602 is a decision block that represents a loop for all records.

Block 1604 represents the logical head of the BOL 600 being latched.

Block 1606 represents the variable H being assigned the RID of the logical head of the BOL 600.

Block 1608 represents the logical head of the BOL 600 being unlatched.

Block 1610 represents the state of the reorganizer 112 being latched.

Block 1612 represents the variable S being assigned the state of the reorganizer 112.

Block 1614 represents the state of the reorganizer 112 being unlatched.

Block 1616 is a decision block that determines whether POS (the position in the scan) has reached the end of the scan. If so, control transfers to Block 1618; otherwise, control transfers to Block 1626.

Block 1618 is a decision block that determines whether H is null. If so, control transfers to Block 1620, which logically deletes the FOL 600 and BOL 600, and then to Block 1622 where the procedure exits; otherwise, control transfers to Block 1624, which calls the procedure PROCESS_BOL_ENTRY, and then returns to Block 1602.

Block 1626 is a decision block that determines whether H is null. If so, control transfers to Block 1628, which calls the procedure SCAN, and then returns to Block 1602; otherwise, control transfers to Block 1630.

Block 1630 is a decision block that determines whether S is "Operating". If so, control transfers to Block 1628, which calls the procedure SCAN, and then returns to Block 1602; otherwise, control transfers to Block 1632, which calls the procedure PROCESS_BOL_ENTRY, and then returns to Block 1602.

Figure 17:
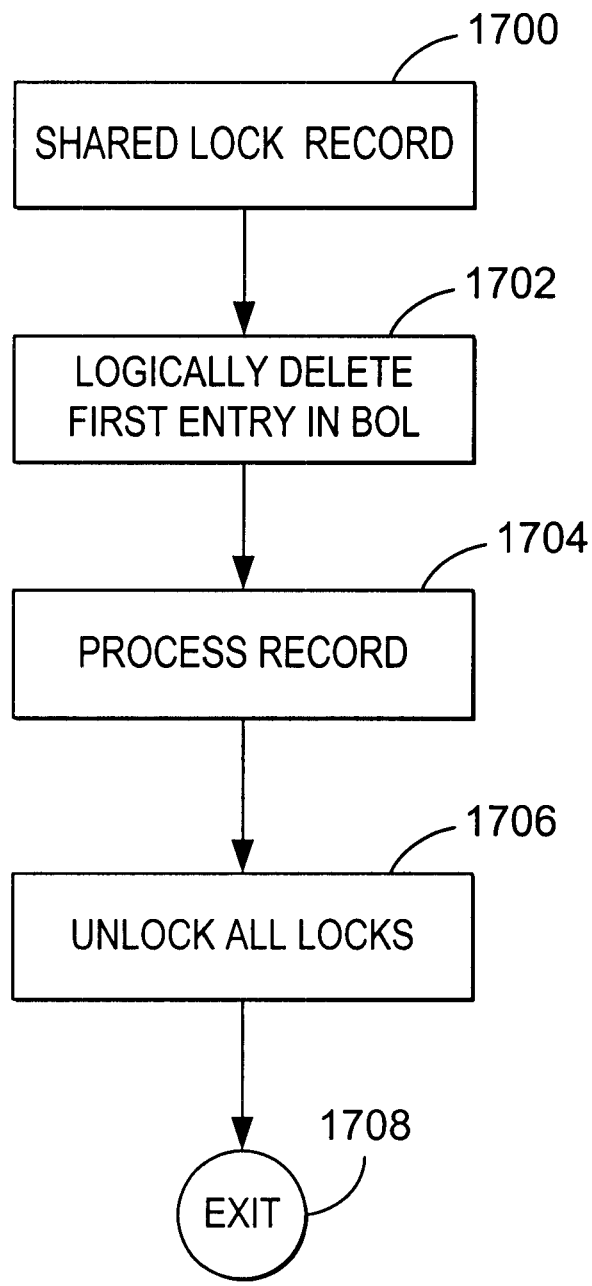
FIG. 17 is a flowchart that describes the logic of the PROCESS_BOL_ENTRY procedure according to the preferred embodiment of the present invention.

FIG. 17 is a flowchart that describes the logic of the PROCESS_BOL_ENTRY procedure.

Block 1700 represents the shared lock being applied to the record that the logical head entry indicates.

Block 1702 represents the first entry in the BOL 600 being logically deleted.

Block 1704 represents that record being processed, e.g., evaluating the WHERE clause and returning the row if appropriate.

Block 1706 represents all locks being unlocked, i.e., if cursor stability is in effect.

Block 1708 represents an exit from the procedure.

Figure 18:
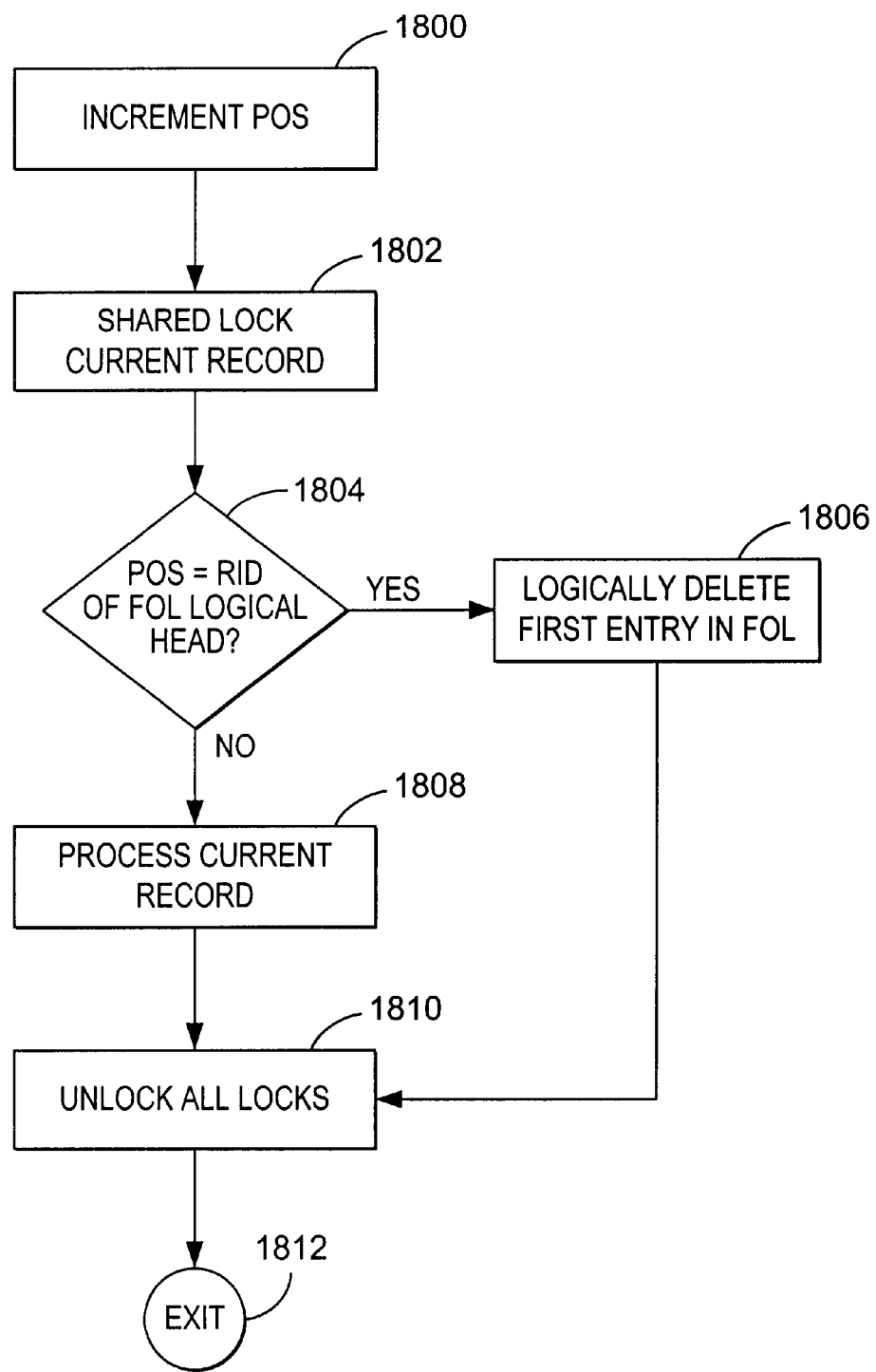
FIG. 18 is a flowchart that describes the logic of the SCAN procedure according to the preferred embodiment of the present invention.
Figure 19A:
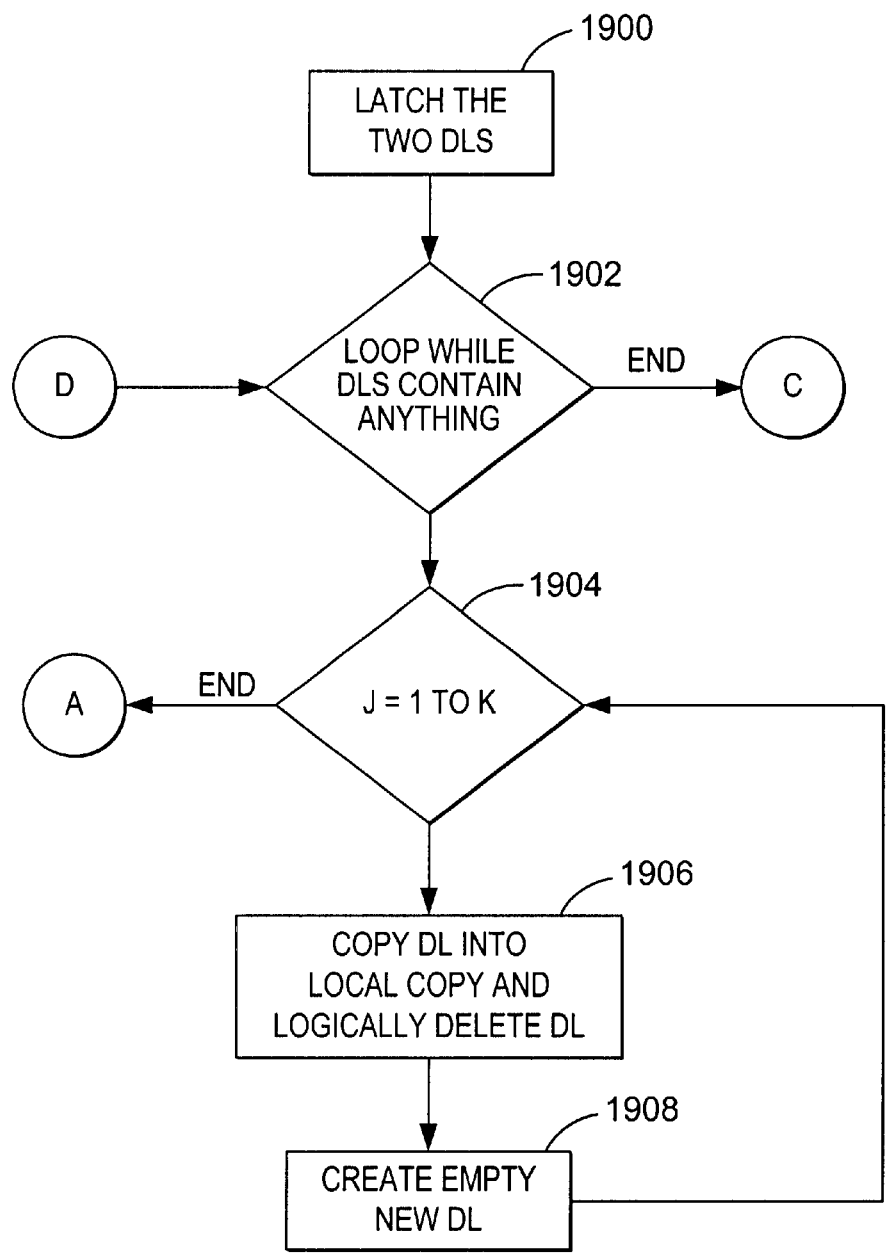
FIGS. 19A–19D together are a flowchart that describes the logic of the CORRECT_RID_LISTS procedure according to the preferred embodiment of the present invention.
Figure 19B:
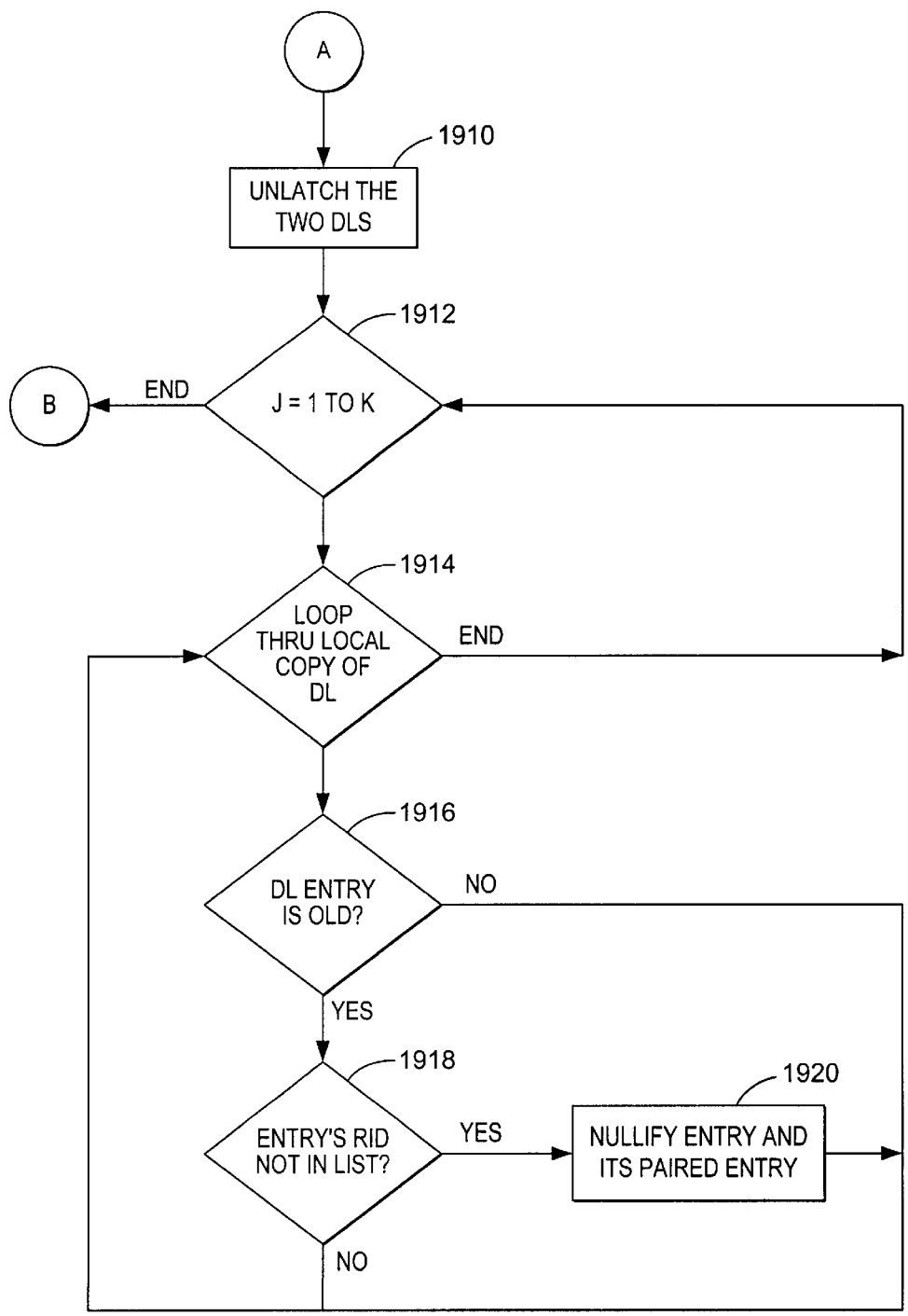
Figure 19C:
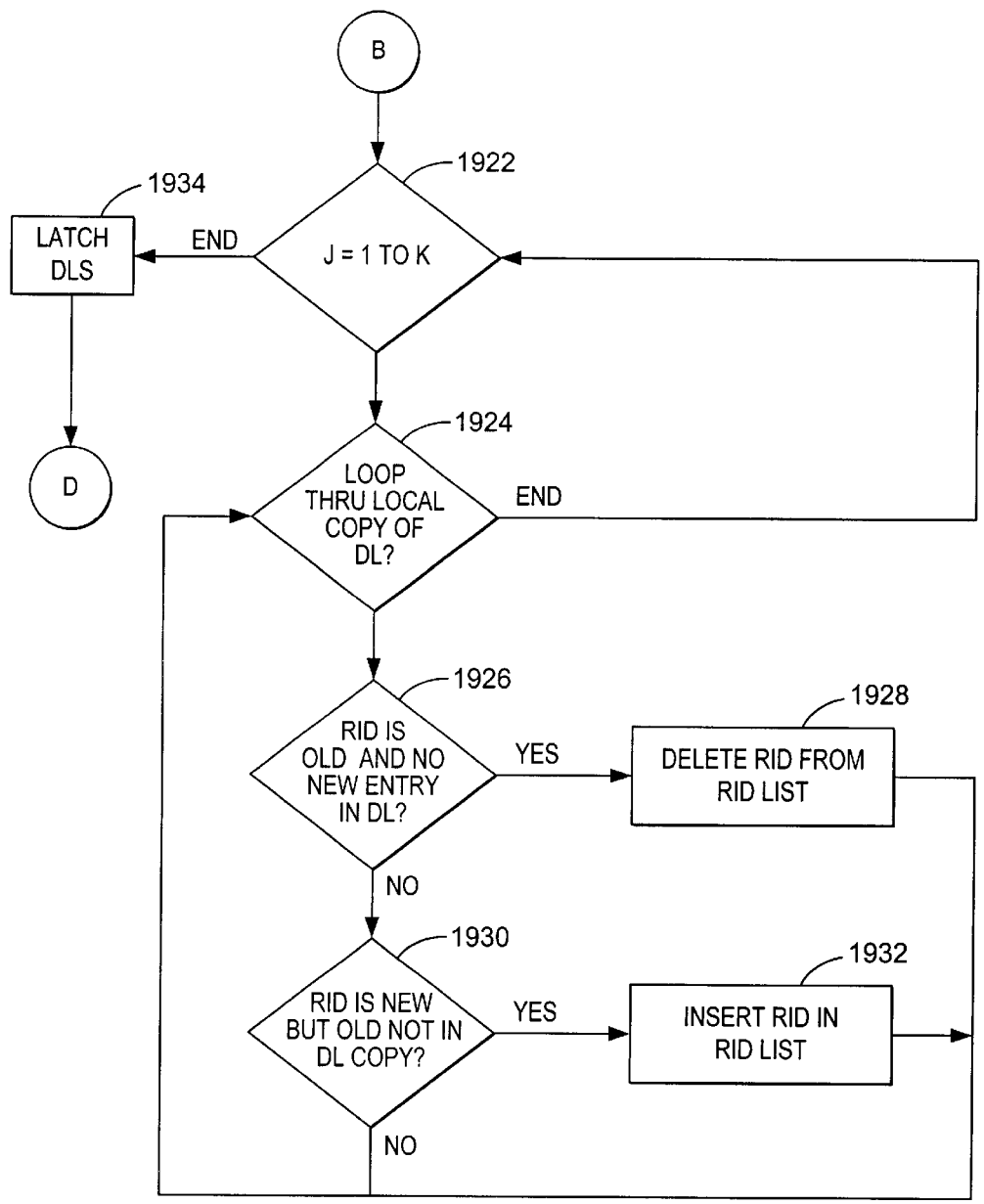
Figure 19D:
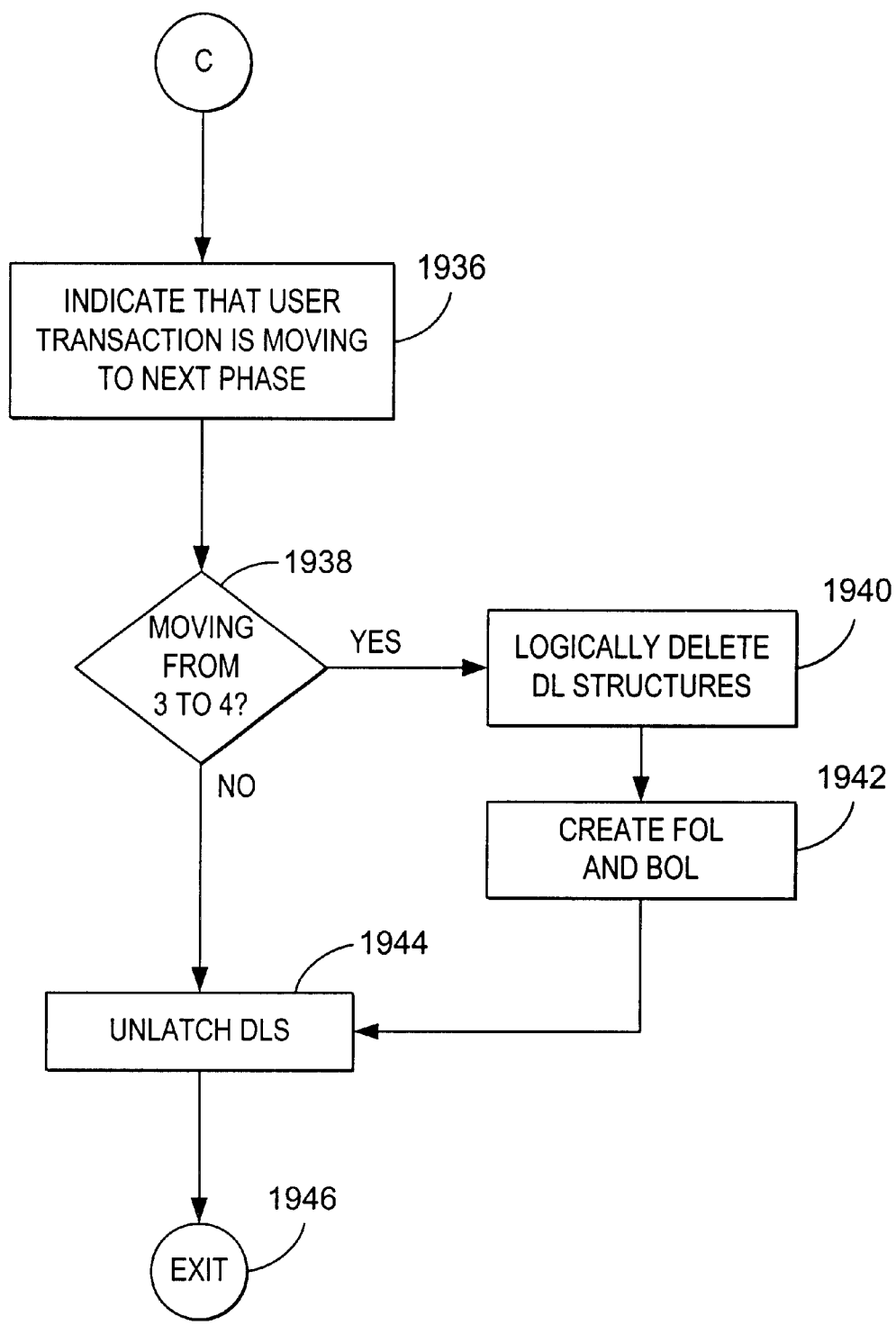

FIG. 18 is a flowchart that describes the logic of the SCAN procedure.

Block 1800 represents the POS (position in the scan) being incremented.

Block 1802 represents a shared lock being applied to the current record.

Block 1804 is a decision block that determines whether POS=RID of the FOL 600 logical head. If so, then control transfers to Block 1806; otherwise, control transfers to Block 1808.

Block 1806 logically deletes the first entry in the FOL 600, e.g., because it moved forward. Thereafter, control transfers to Block 1810.

Block 1808 represents that record being processed, e.g., evaluating the WHERE clause and returning the row if appropriate.

Block 1810 represents all locks being unlocked, i.e., if cursor stability is in effect.

Block 1812 represents an exit from the procedure.

5.3 The Method for a User Performing an Index Scan

This resembles a table 108 space scan. The remainder (non-indexed part) of the WHERE clause, not the whole WHERE clause, is evaluated. The user has a position in a range (key value) of the index 110. At the end of scanning each range, the FOL 600 is empty, since no record can move beyond the range. Therefore, a FOL 600 can be sorted by RID; the system does not need a major sort by key value and a minor sort by RID. The BOL 600 might not be empty.

5.4 The Method for a User Performing a Multiple Index Access

A user performing a multiple index 110 access (on n indices 110) does this:

Create DL 800 structures (indices 802, etc.).

For j=1 to n, perform phases 1, 2, and 3:

1. Initialize the recent RID list to empty. Scan the relevant subset of the index 110 that enables evaluation of the jth predicate. For each RID whose key value satisfies the jth predicate, append the RID to the recent RID list.

2. Sort the recent RID list (ordered by RID) if it comes from more than one key value. Correct both RID lists (as shown herein after) according to the DLs 800.

3. If j=1, make the recent RID list the composite RID list. If j>1, merge the recent RID list into the composite RID list; i.e., calculate the intersection (for a conjunction) or union (for a disjunction). Correct the composite RID list according to the composite DL 800; this includes logically deleting the DLs 800 and creating the FOL 600 and BOL 600 structures for phase 4. The system no longer cares about correcting the recent RID list, since the system already merged it into the composite RID list, and any changes in the recent DL 800 will now be identical to changes in the composite DL 800.

Perform phase 4 once:

4. For each RID in the composite RID list, read the row, evaluate the remainder (if any) of the WHERE clause (for repeatable read) or the entire WHERE clause (for cursor stability), and return the row if it satisfies the clause. Use the FOL 600 and the BOL 600, as in a table 108 space scan; the user has a position in the composite RID list.

When finished, logically delete FOL 600 and BOL 600 structures (indices 602, etc.).

Following is a description of how the user transaction corrects its RID lists according to the DLs 800. It does this at the end of each phase 2 (for both RID lists) and at the end of each phase 3 (for just the composite RID list):

FIGS. 19 A–D is a flowchart that describes the logic of the CORRECT_RID_LISTS procedure, which accepts a parameter K, wherein K=1 signifies correction of just a composite RID list and K=2 signifies correction of both composite and recent RID lists.

Block 1900 represents the two DLs 800 being latched.

Block 1902 is a decision block that represents a loop which tests for emptiness, i.e., it iterates while either DL 800 contains anything. Upon completion of the loop, control transfers to Block 1936 via "C".

Block 1904 is a decision block that represents a loop for J=1 to K, wherein J=1 means composite DL 800, while J=2 means recent DL 800.

Block 1906 represents the DL 800 being copied into a local copy and the DL 800 being logically deleted.

Block 1908 represents the creation of an empty new DL 800.

Block 1910 represents the two DLs 800 being unlatched.

Block 1912 is a decision block that represents a loop for J=1 to K, wherein J=1 means composite RID list and J=2 means recent RID list. This loop makes a first pass at correcting RID lists (to nullify non-qualifying pairs). Upon completion of the loop, control transfers to Block 1922 via "B".

Block 1914 is a decision block that represents a loop through the entries in the local copy of the DL 800 that corresponds to the RID list indicated by J.

Block 1916 is a decision block that determines if an entry in the copy of the DL 800 is "old". If so, control transfers to Block 1918; otherwise, control transfers to Block 1914.

Block 1918 is a decision block that determines if an entry's RID does not exist in the RID list. If so, control transfers to Block 1920; otherwise, control transfers to Block 1914.

Block 1920 represents nullifying the entry and its paired entry (if any). Thereafter, control transfers to Block 1914.

Block 1922 is a decision block that represents a loop for J=1 to K, wherein J=1 means composite RID list and J=2 means recent RID list. This loop makes a second pass at correcting RID lists. Upon completion of the loop, control transfers to Block 1934.

Block 1924 is a decision block that represents a loop through the entries in the local copy of the DL 800 that corresponds to the RID list indicated by J. Upon completion of the loop, control transfers to Block 1922.

Block 1926 is a decision block that determines if the local copy of the DL 800 contains an "old" entry for an RID but no "new" entry for that RID. If so, control transfers to Block 1928; otherwise, control transfers to Block 1930.

Block 1928 represents deleting the RID from the RID list. Thereafter, control transfers to Block 1924.

Block 1930 is a decision block that determines if the local copy of the DL 800 contains a "new" entry for an RID but no "old" entry for that RID. If so, control transfers to Block 1932; otherwise, control transfers to Block 1924.

Block 1932 represents inserting the RID into the RID list (maintaining sorted order). Thereafter, control transfers to Block 1924.

Block 1934 represents the two DLs 800 being latched. Control then transfers to Block 1902 via "D".

Block 1936 indicates that the user transaction is moving to the next phase.

Block 1938 is a decision block that determines if the user transaction is moving from phase 3 to phase 4. If so, control transfers to Block 1940; otherwise, control transfers to Block 1944.

Block 1940 represents logically deleting DL 800 structures.

Block 1942 represents creating the FOL 600 and BOL 600 structures.

Block 1944 represents the DLs 800 being unlatched. Thereafter, the procedure exists at 1946.

In the above method, a possible optimization, if the outer loop is executed more than a parameter-controlled number of times, is to suspend the reorganizer 112.

Following is the reason for using two passes rather than one: With one pass, suppose that a new entry and an old entry are paired, and the new entry has a lower RID. The user transaction will find the new entry first. The transaction should insert the new entry's RID in its RID list only if the old entry's RID matches a RID that is already in the RID list. Lack of a match means that the new entry's RID does not represent a qualifying record. To find the old entry, the user transaction must do a searched access (rather than a sequential access) into the local copy of the DL 800, but there is no index, so there must be a search via another sequential access, which is an extra expense.

6.0 Extensions Based on the Methods

This section describes possible extensions that could be added to the methods of the present invention.

6.1 Logging and Recovery

Logging and recovery could be added (for both the reorganizer 112 and the users) during online reorganization. For logging, a new type of log record can simply be added, which means that a record has been moved from the old RID to the new.

Logging could also be included for movement lists.

Movement lists could also be stored in artificial data pages; i.e., not just in main storage. This implies that a transaction that is ordinarily considered read-only (because it just does a SELECT) is not really read-only, since it writes into the movement lists.

6.2 Multiple-Table Queries

So far, only transactions that operate on one table 108 have been considered. An alternative would consider transactions that operate on several tables 108.

6.3 Transactions That Write

So far, only "reader" transactions have been considered. This can be generalized in two ways:

Even if a transaction is a reader, consider writers' effect on this transaction's movement lists.

Consider movement lists and synchronization for writers. In general, the same methods that are used for readers can be used, recognizing that locks are held until commit, for serializability.

6.4 Index Reorganization

Online reorganization of an index 110 could be added, not just online reorganization of data with updating of the RIDs in an index 110.

6.5 Possible Reorganizations

To give priority to users, the reorganizer 112 should abort instead of waiting when the reorganizer's 112 lock request conflicts with a user's lock.

In addition, a warning bit could be maintained to indicate that the FOL 600 contains an entry for the current page.

7.0 Summary

Any database management system can need some type of reorganization. To avoid taking a very large or highly available database offline for reorganization, a solution is to reorganize online. Methods have been described for performing a certain type of reorganization online. The reorganization restores clustering and removes overflows.

The methods include synchronization, and they use movement lists to track the reorganization's movement of records across a user's position within a scan of data. The reorganization's tracking of movement of records and the subsequent correction of user transactions are mechanisms that correct inaccuracy in user transactions and thus allow cursor stability during online reorganization in place. The novelty is in allowing high throughput concurrent usage during in-place online restoration of clustering. As the amount of information and dependence on computers both grow, the number of very large or highly available databases will grow. Therefore, the importance of online reorganization will grow.

8.0 References

The following references are incorporated by reference herein:

1. Amer. Natl. Standards Institute, "Database Language SQL," X3.135-1992, New York, 1992.
2. M. M. Astrahan et al., "System R: Relational Approach to Database Management," ACM Trans. Database Syst., Vol. 1, No. 2, June 1976, pp. 97–137.
3. C. J. Date and C. J. White, A Guide to DB2, 4th edition, Addison-Wesley, Reading, Mass., 1993.
4. D. J. Haderle and R. D. Jackson, "IBM Database 2 Overview," IBM Syst. J., Vol. 23, No. 2, 1984, pp. 112–125.
5. IBM Corp., "DB2 for OS/390 Version 5 Utility Guide and Reference," SC26-8967-00, June 1997.
6. C. Mohan, "A Survey of DBMS Research Issues in Supporting Very Large Tables," in D. Lomet, Ed., Foundations of Data Organization and Methods (Proc. 4th Intl. Conf. Foundations of Data Organization and Methods, October 1993), Lecture Notes in Computer Science 730, Springer-Verlag, New York, pp. 279–300.
7. E. Omiecinski, L. Lee, and P. Scheuermann, "Concurrent File Reorganization for Record Clustering: A Performance Study," Proc. 8th Intl. Conf. Data Engineering, IEEE-CS, February 1992, pp. 265–272. For more details, see their later work [8].
8. E. Omiecinski, L. Lee, and P. Scheuermann, "Performance Analysis of a Concurrent File Reorganization Method for Record Clustering," IEEE Trans. Knowledge and Data Engin., Vol. 6, No. 2, April 1994, pp. 248–257.
9. B. Salzberg and A. Dimock, "Principles of Transaction-Based On-Line Reorganization," Proc. 18th Intl. Conf. Very Large Data Bases, Morgan Kaufmann Publishers, San Mateo, Calif., August 1992, pp. 511–520.
10. G. H. Sockut and T. A. Beavin, "Interaction Between Application of a Log and Maintenance of a Table that Maps Record Identifiers During Online Reorganization of a Database," U.S. Pat. No. 5,721,915, February 1998.
11. G. H. Sockut, T. A. Beavin, and C.-C. Chang, "A Method for On-line Reorganization of a Database," IBM Syst. J., Vol. 36, No. 3, 1997, pp. 411–436; erratum in Vol. 37, No. 1, 1998, p. 152.
12. G. H. Sockut and R. P. Goldberg, "Database Reorganization—Principles and Practice," Computing Surveys, ACM, Vol. 11, No. 4, December 1979, pp. 371–395.
13. G. H. Sockut and B. R. Iyer, "Reorganizing Databases Concurrently with Usage: A Survey," Tech. Report 03.488, IBM Santa Teresa Lab., San Jose, Calif., June 1993.
14. G. Wiederhold, Database Design, 2nd edition, McGraw-Hill, New York, 1983.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program providing database management functions could benefit from the present invention.

In summary, the present invention discloses a method, system, and article of manufacture for in-place reorganization of a database that allows high-throughput concurrent usage by users of the database. The reorganization's movement of records are tracked across a user transaction's position within a scan of the database. The behavior of the user transaction is corrected to account for the movement of the records.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of providing in-place reorganization of a database to achieve reasonably accurate results for user transactions during high-throughput concurrent usage of the database, comprising:
   (a) tracing, in a computer, the reorganization's movement of records across a user transaction's position within a scan of the database by maintaining at least one movement list to track the reorganization's movement of records that the user transaction through access, wherein the movement list comprises a differential list that tracks the records that the reorganization moves forward, backward, or behind the user transaction; and
   (b) correcting, in the computer, a behavior of the user transaction to account for the movement of the records.

2. The method of claim 1, wherein the reorganization clusters data.

3. The method of claim 1, wherein the reorganization provides online restoration of clustering.

4. The method of claim 1, wherein the reorganization distributes free space evenly.

5. The method of claim 1, wherein the reorganization removes overflow.

6. The method of claim 1, wherein the reorganization is performed concurrently with a plurality of concurrent user transactions.

7. The method of claim 6, wherein the concurrent user transactions are allowed to use different types of access to the database.

8. The method of claim 1, wherein the reorganization allows repeatable read for the user transaction.

9. The method of claim 1, wherein the reorganization does not require repeatable read but does allow cursor stability for the user transaction.

10. The method of claim 1, wherein the tracking step comprises concurrently maintaining different types of movement lists appropriate for different types of access by different user transactions.

11. The method of claim 10, wherein a type of access determines a type of movement list used in the reorganization.

12. The method of claim 10, wherein the movement list comprises at least one of the lists in a group comprising a forward ordered list, backward ordered list, and the differential list.

13. The method of claim 12, wherein the forward ordered list tracks records that the reorganization moves forward.

14. The method of claim 12, wherein the forward ordered list tracks records that the user transaction has already processed.

15. The method of claim 12, further comprising omitting redundant processing of records that appear in the forward ordered list.

16. The method of claim 12, wherein the backward ordered list tracks records that the reorganization moves backward.

17. The method of claim 12, wherein the backward ordered list tracks records that the user transaction has not yet processed.

18. The method of claim 12, further comprising processing records that appear on the backward ordered list.

19. The method of claim 12, further comprising applying the differential list to a list of records maintained by the user transaction to correct the list of records.

20. The method of claim 19, wherein the list of records is derived from an index.

21. The method of claim 19, further comprising correcting the list of records by insert new entries of the list into the differential list and by deleting old entries of the list from the differential list.

22. The method of claim 12, further comprising modifying the differential list when the reorganization moves a record.

23. The method of claim 12, further comprising maintaining both a recent differential list and a composite differential list.

24. A computer-implemented system for providing in-place reorganization of a database to achieve reasonably accurate results for user transactions during high-throughput concurrent usage of the database, comprising:

(a) a computer;

(b) means, performed by the computer, for tracking a reorganization's movement of records across a user transaction's position within a scan of the database by maintaining at least one movement list to track the reorganization's movement of records that the user transaction might access, wherein he movement list comprises a differential list that tracks the records that the reorganization moves forward, backward, or behind the user transaction; and (c) means, performed by the computer, for correcting a behavior of the user transaction to account for the movement of the records.

25. The system of claim 24, wherein the reorganization clusters data.

26. The system of claim 24, wherein the reorganization provides online restoration of clustering.

27. The system of claim 24, wherein the reorganization distributes free space evenly.

28. The system of claim 24, wherein the reorganization removes overflow.

29. The system of claim 24, wherein the reorganization is performed concurrently with a plurality of concurrent user transactions.

30. The system of claim 29, wherein the concurrent user transactions are allowed to use different types of access to the database.

31. The system of claim 24, wherein the reorganization allows repeatable read for the user transaction.

32. The system of claim 24, wherein the reorganization does nor require repeatable read but does allow cursor stability for the user transaction.

33. The system of claim 24, wherein the means for tracking comprises means for concurrently maintaining different types of movement lists appropriate for different types of access by different user transactions.

34. The system of claim 33, wherein a type of access determines a type of movement list used in the reorganization.

35. The system of claim 33, when the movement list comprises at least one of the lists in a group comprising a ford ordered list, backward ordered list, and the differential list.

36. The system of claim 35, wherein the forward ordered list tracks records that the reorganization moves forward.

37. The system of claim 35, wherein the forward ordered list tracks records that the user transaction has already processed.

38. The system of claim 35, further comprising means for omitting redundant processing of records that appear in the forward ordered list.

39. The system of claim 35, wherein the backward ordered list tracks records that the reorganization moves backward.

40. The system of claim 35, wherein tie backward ordered list tracks records that the user transaction has not yet processed.

41. The system of claim 35, further comprising means for processing records that appear on the backward ordered list.

42. The system of claim 35, further comprising means for applying the differential list to a list of records maintained by die user transaction to correct the list of records.

43. The system of claim 42, wherein the list of records is derived from an index.

44. The system of claim 42, further comprising means for correcting the list of records by inserting new entries of the list into the differential list and by deleting old entries of the list from the differential list.

45. The system of claim 35, further comprising means for modifying the differential list when the reorganization moves a record.

46. The system of claim 35, further comprising means for maintaining both a recent differential list and a composite differential list.

47. An article of manufacture embodying logic for a computer-implemented method of providing in-place reorganization of a database to achieve reasonably accurate results for user transactions during high-throughput concurrent usage of the database, comprising:

(a) tracking the reorganization's movement of records across a user transaction's position within a scan of the database by maintaining at least one movement list to track the reorganization's movement of records that the user transaction might access, wherein the movement list comprises a differential list that tracks the records that the reorganization moves forward, backward, or behind the user transaction; and (b) correcting a behavior of the user transaction to account for the movement of the records.

48. The method of claim 47, wherein the reorganization clusters data.

49. The method of claim 47, wherein the reorganization provides online restoration of clustering.

50. The method of claim 47, wherein the reorganization distributes free space evenly.

51. The method of claim 47, wherein the reorganization removes overflow.

52. The method of claim 47, wherein the reorganization is performed concurrently with a plurality of concurrent user transactions.

53. The method of claim 52, wherein the concurrent user transactions are allowed to use different types of access to the database.

54. The method of claim 47, wherein the reorganization allows repeatable read for the user transaction.

55. The method of claim 47, wherein the reorganization does not require repeatable read but does allow cursor stability for the user transaction.

56. The method of claim 47, wherein the tracking step comprises concurrently maintaining different types of movement lists appropriate for different types of access by different user transactions.

57. The method of claim 56, wherein a type of access determines a type of movement list used in the reorganization.

58. The method of claim 56, wherein the movement list comprises at least one of the lists in a group comprising a forward ordered list, backward ordered list, and the differential list.

59. The method of claim 58, wherein the forward ordered list tracks records that the reorganization moves forward.

60. The method of claim 58, wherein the forward ordered list tracks records that the user transaction has already processed.

61. The method of claim 58, further comprising omitting redundant processing of records that appear in the forward ordered list.

62. The method of claim 58, wherein the backward ordered list tracks records that the reorganization moves backward.

63. The method of claim 58, wherein the backward ordered list tracks records that the user transaction has not yet processed.

64. The method of claim 58, further comprising processing records that appear on the backward ordered list.

65. The method of claim 58, further comprising applying the differential list to a list of records maintained by the user transaction to correct the list of records.

66. The method of claim 65, wherein the list of records is derived from an index.

67. The method of claim 65, further comprising correcting the list of records by inserting new entries of the list into the differential list and by deleting old entries of the list from the differential list.

68. The method of claim 58, further comprising modifying the differential list when the reorganization moves a record.

69. The method of claim 58, further comprising maintaining both a recent differential list and a composite differential list.

\* \* \* \* \*

UNITED STATES PATENT AND TRADEMARK OFFICE
CERTIFICATE OF CORRECTION

PATENT NO. : 6,411,964 B1
DATED : June 25, 2002
INVENTOR(S) : Balakrishna Raghavendra Iyer and Gary Howard Sockut It is certified that error appears in the above-identified patent and that said Letters Patent is hereby corrected as shown below:

Column 26,
Line 44, "tracing" should read -- tracking --
Line 48, "through" should read -- might --

Column 27,
Line 38, "insert" should read -- inserting --

Column 28,
Line 14, "nor" should read -- not --
Line 25, "ford" should read -- forward --

Signed and Sealed this

Eighth Day of April, 2003

JAMES E. ROGAN
*Director of the United States Patent and Trademark Office*